US008590018B2

(12) United States Patent
Thavasi et al.

(10) Patent No.: US 8,590,018 B2
(45) Date of Patent: Nov. 19, 2013

(54) TRANSACTION AUTHENTICATION MANAGEMENT SYSTEM WITH MULTIPLE AUTHENTICATION LEVELS

(75) Inventors: Manivannan Thavasi, Rochester, MN (US); Thembani Togwe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 13/228,414

(22) Filed: Sep. 8, 2011

(65) Prior Publication Data

US 2013/0067546 A1    Mar. 14, 2013

(51) Int. Cl.
G06F 7/04    (2006.01)
G06F 17/30   (2006.01)
H04L 29/06   (2006.01)

(52) U.S. Cl.
USPC .............. 726/4; 726/2; 726/5; 726/7; 726/21; 726/28

(58) Field of Classification Search
USPC .................................. 726/2–7, 16–21, 26–28
See application file for complete search history.

(56) References Cited

U.S. PATENT DOCUMENTS

| | | | |
|---|---|---|---|
| 5,897,616 A | 4/1999 | Kanevsky | |
| 6,810,480 B1 | 10/2004 | Parker | |
| 6,983,061 B2 * | 1/2006 | Ikegami et al. | 382/115 |
| 7,039,951 B1 * | 5/2006 | Chaudhari et al. | 726/7 |
| 7,055,170 B1 | 5/2006 | Karmouch | |
| 7,234,156 B2 | 6/2007 | French | |
| 7,350,229 B1 * | 3/2008 | Lander | 726/8 |
| 7,448,070 B2 | 11/2008 | Barkley | |
| 7,464,162 B2 | 12/2008 | Chan | |
| 7,664,952 B2 * | 2/2010 | Eguchi et al. | 713/168 |
| 7,818,290 B2 | 10/2010 | Davis | |
| 7,865,937 B1 * | 1/2011 | White et al. | 726/2 |
| 8,161,530 B2 | 4/2012 | Meehan | |
| 8,171,288 B2 | 5/2012 | Brown | |
| 2002/0157029 A1 * | 10/2002 | French et al. | 713/202 |
| 2003/0115487 A1 | 6/2003 | Andrews | |
| 2004/0088586 A1 | 5/2004 | Wesinger | |
| 2005/0229000 A1 * | 10/2005 | Shoji et al. | 713/182 |
| 2006/0053296 A1 | 3/2006 | Busboom | |
| 2006/0288234 A1 | 12/2006 | Azar | |

(Continued)

OTHER PUBLICATIONS

Bergadano—"Identity Verification through Dynamic Keystroke Analysis", University of Torino, (ACM Digital Library 2003 Article), Published in:• Journal—Intelligent Data Analysis archive, vol. 7 Issue 5 (Oct. 2003).

(Continued)

Primary Examiner — Tae Kim
(74) Attorney, Agent, or Firm — David Mims; Mark P Kahler

(57) ABSTRACT

An operating system of an information handling system (IHS) initializes a security tool to provide security management during user-to-user transactions. The security tool may determine the user's type and invokes a user personal profile and application profile information that pertains to the transaction. The security tool may use the user personal profile and application profile information during user authentications. The security tool determines an initial authentication level and may modify that authentication level during user-to-user transaction operations. The security tool may perform substantially continuous user authentication during transaction operations by employing learned behavior, historical knowledge, and other information that the security tool maintains in a security information store.

20 Claims, 15 Drawing Sheets

(56) References Cited

U.S. PATENT DOCUMENTS

| | | |
|---|---|---|
| 2008/0091453 A1 | 4/2008 | Meehan |
| 2009/0150320 A1 | 6/2009 | Geppert |
| 2011/0004526 A1 | 1/2011 | Hammad |
| 2011/0007705 A1 | 1/2011 | Buddhikot |
| 2011/0239276 A1 | 9/2011 | Garcia Garcia |
| 2012/0204239 A1 | 8/2012 | Suginaka |

OTHER PUBLICATIONS

Tsai—"Information Security Issue of Enterprises Adopting the Application of Cloud Computing", INSPEC/IEEE; pp. 645-649, (2010).
Cho—"Web Based Keystroke Dynamics Identity Verification Using Neural Network", Journal of Organizational Computing and Electronic Commerce, vol. 10, No. 4, pp. 295-307 (2000).
Merrill Datasite—"Five Keys to Ironclad Security in Your M & A Transactions", Downloaded http://www.datasite.com/cps/rde/xbcr/datasite/WP_5_Keys_to_Ironclad_Securty_mds.pdf (2010).
Obaidat—"Keystroke Dynamics Based Authentication", downloaded http://www.cse.msu.edu/~cse891/Sect601/textbook/10.pdf (2000).
Peacock—"Typing Patterns: A Key to User Identification", Downloaded http://www.csis.pace.edu/~ctappert/papers/MIT-keystroke.pdf (2004).
Qazi—"Securing Wireless Mesh Networks with Ticket-Based Authentication", INSPEC/IEEE (2008).
Shin—"A Study on the Secure ebXML Transaction Models", World Academy of Science, Engineering and Technology 46 (2008).
Gaines—"Authentication By Keystroke Timing: Some Preliminary Results", Rand's Research Project sponsored by the National Science Foundation under Grant No. MCS76-00720 (May 1980).
Monrose—"Keystroke Dynamics as a Biometric for Authentication", Courant Institute of Mathematical Sciences, New York University, New York, NY (Mar. 1, 1999).
Jiang—"Keystroke Statistical Learning Model for Web Authentication", National Chiao Tung University, Taiwan (Copyright 2007).
Lau—"Enhanced User Authentication Through Keystroke Biometrics", Massachusetts Institute of Technology (Dec. 9, 2004).
Zhao—"Learning User Keystroke Patterns for Authentication", Proceeding of World Academy of Science, Engineering and Technology, vol. 14, 2006, pp. 65-70.
GIOT1—"GREYC Keystroke: a Benchmark for Keystroke Dynamics Biometric Systems", published in IEEE International Conference on Biometrics: Theory, Applications and Systems (BTAS 2009).
GIOT2—"Keystroke Dynamics Authentication for Collaborative Systems", Proceeds of the 2009 International Symposium on Collaborative Technologies and Systems (CTS '09) IEEE Computer Society Washington, DC, USA 2009.

\* cited by examiner

FIG. 4

| | PERSONAL ID 451 | NAME 452 | ORGANIZATION 453 | INTERACTING USER 454 | RELATION-SHIP ID 455 | RELATION-SHIP NAME 456 | COMMUNICATION NATURE 457 | AUTHEN-TICATION ID 458 | DEFAULT SECURITY LEVEL 459 |
|---|---|---|---|---|---|---|---|---|---|
| 461 | 4567 | AAAA | SUPPLY CHAIN | 3234 | R567 | CO-WORKER | INFORMAL | A234 | 1 |
| 462 | 5687 | BBBB | DEVELOPMENT | 5677 | R687 | MANAGER | FORMAL | R566 | 2 |
| 463 | 3456 | CCCC | SALES | 3322 | R456 | SENIOR MANAGER | CONFIDENTIAL | T567 | 3 |
| 464 | 4566 | DDDD | FINANCE | 2144 | R566 | MENTOR | INFORMAL | Y4567 | 1 |

INITIATING USER PERSONAL ID KEY 410 (columns 451–453)
PERSONAL PROFILE INFORMATION 405 (columns 454–457)
AUTHENTICATION KEY 420 (columns 458–459)

Figure 5:
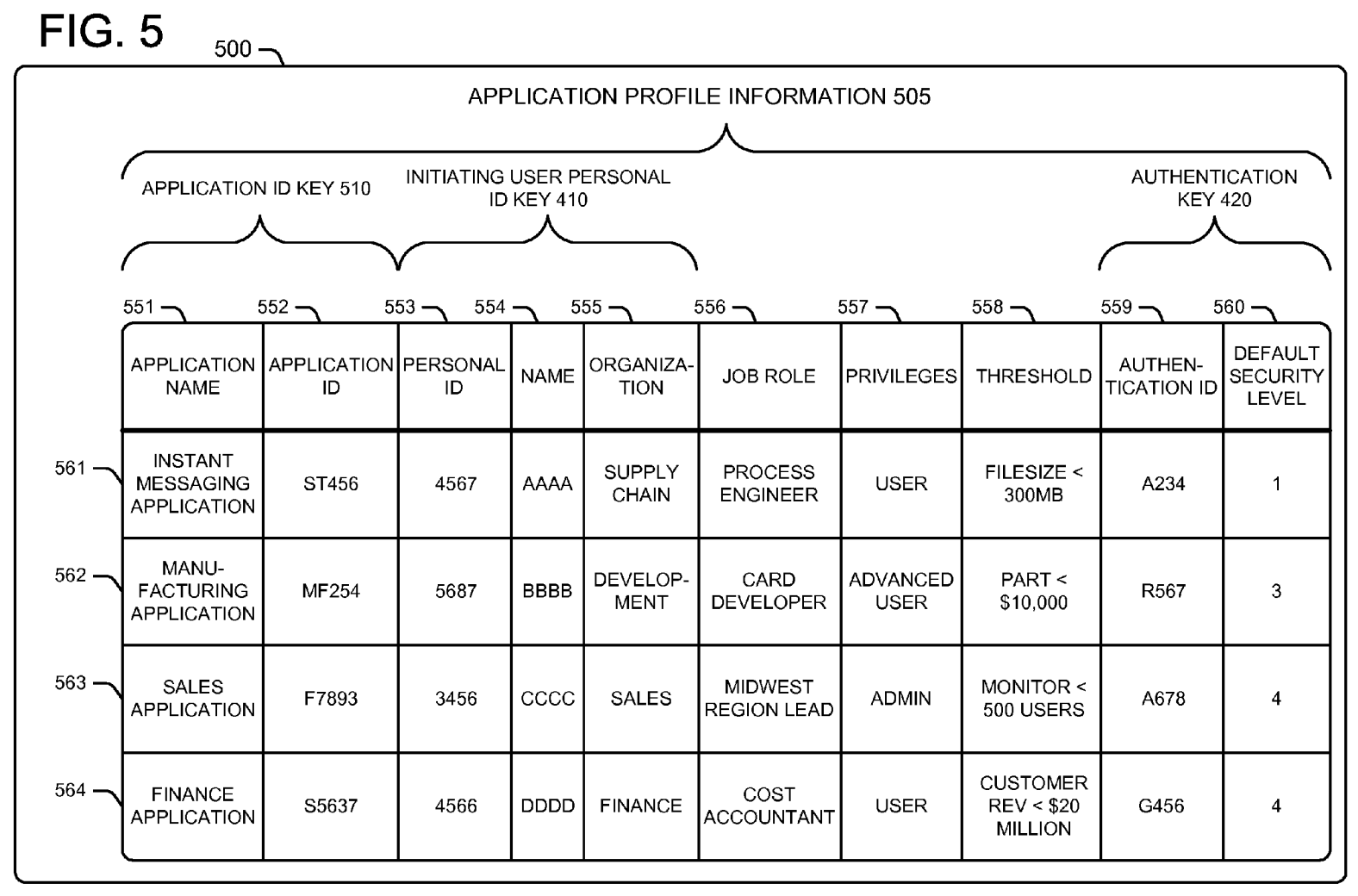

APPLICATION PROFILE INFORMATION 505

| | APPLICATION ID KEY 510 | | INITIATING USER PERSONAL ID KEY 410 | | | | | AUTHENTICATION KEY 420 | |
|---|---|---|---|---|---|---|---|---|---|
| APPLICATION NAME 551 | APPLICATION ID 552 | PERSONAL ID 553 | NAME 554 | ORGANIZA-TION 555 | JOB ROLE 556 | PRIVILEGES 557 | THRESHOLD 558 | AUTHEN-TICATION ID 559 | DEFAULT SECURITY LEVEL 560 |
| 561 INSTANT MESSAGING APPLICATION | ST456 | 4567 | AAAA | SUPPLY CHAIN | PROCESS ENGINEER | USER | FILESIZE < 300MB | A234 | 1 |
| 562 MANU-FACTURING APPLICATION | MF254 | 5687 | BBBB | DEVELOP-MENT | CARD DEVELOPER | ADVANCED USER | PART < $10,000 | R567 | 3 |
| 563 SALES APPLICATION | F7893 | 3456 | CCCC | SALES | MIDWEST REGION LEAD | ADMIN | MONITOR < 500 USERS | A678 | 4 |
| 564 FINANCE APPLICATION | S5637 | 4566 | DDDD | FINANCE | COST ACCOUNTANT | USER | CUSTOMER REV < $20 MILLION | G456 | 4 |

600 — AUTHENTICATION LAYER INFORMATION 605

Authentication Key 420 spans columns 651–655. Application ID Key 510 spans columns 656–660.

| | 651 AUTHEN-TICATION ID | 652 DEFAULT SECURITY LEVEL | 653 AUTHEN-TICATION NAME | 654 AUTHEN-TICATION METHOD | 655 AUTHEN-TICATION TYPE | 656 APPLICATION NAME | 657 APPLICA-TION ID | 658 FREQUENCY | 659 KEY INDICA-TOR | 660 USER DEFINITIONS |
|---|---|---|---|---|---|---|---|---|---|---|
| 661 | A234 | 1 | PASSWORD | STATIC | ACTIVE | INSTANT MESSAGING APPLICATION | ST456 | 20 MIN | REPEAT WORD > 10/MIN | |
| 662 | R567 | 3 | TEXT ANALYSIS | DYNAMIC | PASSIVE | MANU-FACTURING APPLICATION | MF254 | 1 HR | | |
| 663 | A678 | 4 | FINGERPRINT BIOMETRIC | DYNAMIC | ACTIVE | SALES APPLICATION | F7893 | 1 HR | | |
| 664 | G456 | 4 | FACIAL RECOGNITION BIOMETRIC | DYNAMIC | PASSIVE | FINANCE APPLICATION | S5637 | 1 HR | | |

FIG. 8A 800

| | AUTHENTICATION KEY 420 | | INITIATING USER PERSONAL ID KEY 410 | | | ANALYSIS LAYER INFORMATION 805 | | | | LEARNED BEHAVIOR KEY 810 | | |
|---|---|---|---|---|---|---|---|---|---|---|---|---|
| | 841 | 842 | 843 | 844 | 845 | 846 | 847 | 848 | 849 | 850 | 851 | 852 | 853 |
| | AUTHEN-TICATION ID | DEFAULT SECURITY LEVEL | PER-SONAL ID | NAME | ORGANI-ZATION | MATCH ANALY-SIS | OBSERVED CONFI-DENCE LEVEL | CON-FIDENCE THRES-HOLD | NEW WORDS | SEN-TENCE STRUC-TURE | CLICK BE-HAVIOR | KEY-STROKE BEHAVIOR | BIO-METRIC CHANGES |
| 861 | A234 | 1 | 4567 | AAAA | SUPPLY CHAIN | 25 OUT OF 50 | 50 | 75 | BUDDY | REFER TO FIG. 8B | INFOR-MATION ACCESS ORDER | 25 WPM | FACIAL RECOG-NITION CHANGES |
| 862 | R567 | 3 | 5687 | BBBB | DEVEL-OPMENT | | | | | | | | |
| 863 | A678 | 4 | 3456 | CCCC | SALES | | | | | | | | |
| 864 | G456 | 4 | 4566 | DDDD | FINANCE | | | | | | | | |

FIG. 8B

| 881 | 882 | 883 | 884 | 885 | 886 |
|---|---|---|---|---|---|
| COMMON WORDS | SALUTATIONS | VERBS | NOUNS | EXPRESSIONS | ACRONYMS |
| OKAY, YOU BET | SIR | STRONG, PERSISTENT, TOUGH | MACHINE, CABLE | GOOD TO HEAR FROM YOU AGAIN | ASAP |

SENTENCE STRUCTURE INFORMATION 850

891

TRANSACTION AUTHENTICATION MANAGEMENT SYSTEM WITH MULTIPLE AUTHENTICATION LEVELS

BACKGROUND

The disclosures herein relate generally to information handling systems (IHSs), and more specifically, to the management of transaction security in an IHS.

Information handling systems (IHSs) employ operating systems, system software and applications to enable a user to communicate with an IHS. A user may log on to an IHS to access a resource in the IHS. In many circumstances, it is desirable that the user performs a transaction with the IHS in a secure manner. One IHS may connect to another IHS via a network to enable peer-to-peer transactions between users of these IHSs. Conducting these transactions in a secure manner may also be desirable. IHS applications may provide user authentication as a security measure for user transactions. Effective security management of user transactions may improve user and IHS security.

BRIEF SUMMARY

In one embodiment, an authentication method is disclosed that includes receiving from an initiating user, by a security tool, a request for a transaction. The method also includes performing, by the security tool, a first authentication of the initiating user for the transaction, the first authentication employing a first authentication level. The method further includes authorizing the transaction to proceed, by the security tool, in response to the first authentication of the initiating user. The method still further includes performing, by the security tool, a plurality of subsequent authentications of the initiating user after the first authentication of the initiating user and during the transaction. In this particular embodiment, at least one of the plurality of subsequent authentications employs a different authentication level than the first authentication level.

In one embodiment, the security tool performs the plurality of subsequent authentications substantially continuously after the first authentication. The security tool may modify the authentication level of at least one of the subsequent authentications as a function of a relationship between the initiating user and an interacting user. In another embodiment, the security tool may modify the authentication level of at least one of the subsequent authentications as a function lack of confidence in the authenticity of the user. The different authentication levels may include at least one of a password test, a challenge question test, a fingerprint test, a mouse click behavior test, a keystroke behavior test and a retinal scan test.

In one embodiment, the security tool determines and stores a learned user attribute history from the plurality of subsequent authentications, the security tool accessing the learned user attribute history to ascertain the correctness of at least one of the plurality of subsequent authentications. The security tool may access at least one of a personal profile information store, an application profile information store, an authentication layer information store, a verification layer information store and an analysis layer information store to perform the first authentication and subsequent authentications. The security tool may switch from a passive authentication mode to an active authentication mode in response to an authentication failure in at least one of the plurality of subsequent authentications.

In another embodiment, an information handling system (IHS) is disclosed that includes a processor and a memory coupled to the processor. The memory is configured with a security tool that receives a request for a transaction from an initiating user. The security tool performs a first authentication of the initiating user for the transaction, the first authentication employs a first authentication level. The security tool authorizes the transaction to commence in response to the first authentication of the initiating user. The security tool performs a plurality of subsequent authentications of the initiating user after the first authentication of the initiating user and during the transaction, wherein at least one of the plurality of subsequent authentications exhibits a different authentication level than the first authentication.

In yet another embodiment, a security tool computer program product is disclosed that includes a computer readable storage medium. The security tool computer program product includes first instructions that receive a request for a transaction from an initiating user. The security tool computer program product also includes second instructions that perform a first authentication of the initiating user for the transaction, the first authentication employing a first authentication level. The security tool computer program product further includes third instructions that authorize the transaction to commence in response to the first authentication of the initiating user. The security tool computer program product still further includes fourth instructions that perform a plurality of subsequent authentications of the initiating user after the first authentication of the initiating user and during the transaction, wherein at least on of the plurality of subsequent authentications exhibits a different authentication level than the first authentication. The first, second, third and fourth instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 4 shows a personal profile information store that a security tool employs to practice the disclosed transaction security methodology.

FIG. 5 shows an application profile information store that a security tool employs to practice the disclosed transaction security methodology.

FIG. 6 shows an authentication layer information store that a security tool employs to practice the disclosed transaction security methodology.

FIG. 8A shows an analysis layer information store that a security tool may employ to practice the disclosed transaction security methodology.

FIG. 8B shows sentence structure information that a security tool may employ to practice the disclosed transaction security methodology.

DETAILED DESCRIPTION

Figure 1:
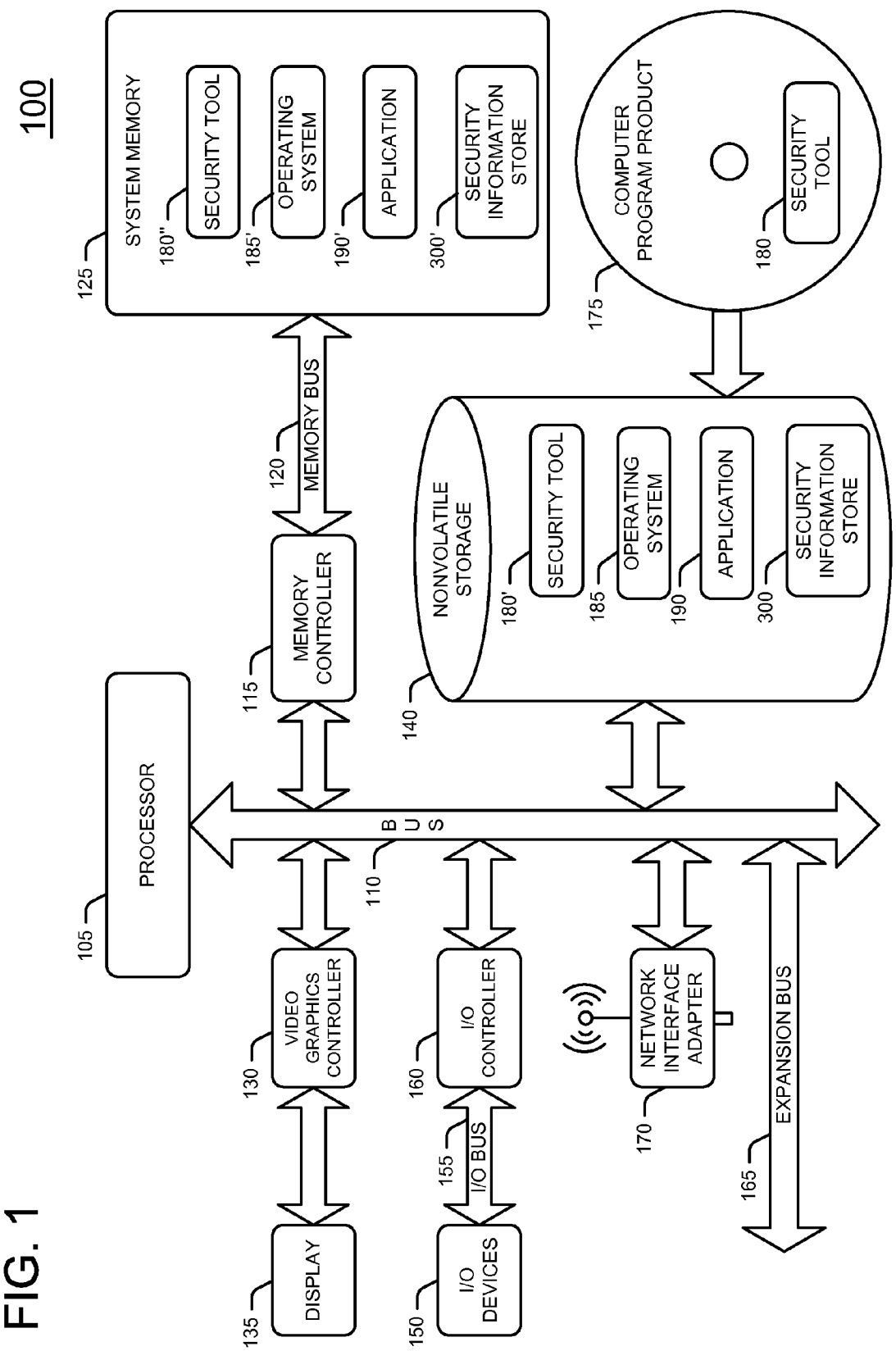
FIG. 1 shows a block diagram of a representative information handling system (IHS) that employs the disclosed transaction security methodology.

Information handling systems (IHSs) typically employ operating systems that execute applications and other processes within the IHS. The IHS may include multiple processors, such as processor cores, or other processor elements for application execution and other tasks. The IHS may employ applications that provide user-to-user transactions, such as user communications or other operations. The term "user" may include a human user or other entity such as an information handling system (IHS) that provides input to, or receives output from, the disclosed methodology and/or disclosed apparatus. The term "transaction" may include communication and/or the exchange of information between the initiating user of the transaction and one or more interacting users. The transaction may include initiation by the user of an application within an IHS wherein the user interacts with the application without interacting with an interacting user.

Secure transactions are those transactions that employ security measures to protect user and IHS information during information transfers and other transactional activity Secure transactions are a significant feature of network communications between secure IHSs such as servers and other IHSs. Increases in wired transactions as well as wireless transactions into and out of IHSs make the security of these transactions increasingly significant.

IHS applications such as security applications or tools may perform security operations such as user identification, user authentication, i.e. user verification, and authorization. Identification as used herein means identifying a user to determine the validity of the user's identity. Providing a user name is one way of identifying a user. "Identification" may be the first step of a transaction and may include requesting input of the user name when logging into an IHS. The terms "authentication" and "verification" are used interchangeably herein. For example, authenticating a user, i.e. verifying a user, is the act of determining if the user is who he, she, or it claims to be. This may be as simple as requesting a password that only the user of a particular user name knows. Security tools may perform authentication when a user logs into an IHS, or during other user transactions.

"Authorization" as used herein means determining the qualification of a particular user to perform a particular activity once the security tool successfully performs user authentication. Different users may associate with different authorization "security levels". For example, after a user logs into an IHS and the security tool authenticates that user's identity, the security tool may determine the user's security level. In one embodiment, a user's security level determines the extent of the information that the user has authority to access after the security tool authenticates, i.e. verifies, the identity of the user. A user with a higher a security level may access more restricted information than a user with a lower security level. The security level of a particular user may determine that user's ability to access certain secure information and resources of the IHS, such as database files and other secure information. Stated alternatively, the security tool may authorize a user with a higher security level to access more restricted or more confidential information than a user with a lower security level.

An IHS security application, i.e. a security tool, may perform a user authentication that requires a password. The security tool may provide a password test that requires a password answer as a response from the user. The security tool may also perform a user authentication by issuing a user challenge question. The security tool generates a challenge question test that requires a corresponding challenge answer, such as a particular response from the user. The password test and challenge question test discussed above are examples of different authentication levels in the disclosed method. An authentication level refers to the degree of verification that the security tool may employ to authenticate a user during user transactions. For example, an initial authentication level may require user authentication with passwords. However, a subsequent and higher authentication level may require authentication with biometric facial recognition or other more extreme security measures.

Different authentication levels may provide different degrees of robustness with respect to achieving user authentication. For example, a retinal scan test and a fingerprint test both provide a higher degree of robustness and higher reliability than a password test. In this manner, a fingerprint test and/or a retinal scan test provides a higher strength test than a password test. A higher strength authentication test, i.e. a robust test such as retinal scanning, exhibits a higher authentication level than a lower strength authentication test such as a password test. A higher strength authentication test provides higher authentication reliability than a lower strength authentication test. In other words, a higher strength or more robust test such as retinal scanning, is more difficult to subvert than a lower strength, less robust authentication test such as username and password.

In more detail, the security tool may perform a user authentication that requires a user to submit a fingerprint for authentication, thus providing a fingerprint test to achieve user authentication. The security tool may also perform a user authentication that requires a user to submit a retinal scan for authentication, thus providing a retinal scan test to achieve user authentication. The security tool may perform the fingerprint test and/or the retinal scan test and other user authentications when a user is logging into an IHS to gain access to IHS resources. The password test, fingerprint test and retinal scan test are examples of different authentication levels that the disclosed method may employ to authenticate a particular user. Authentication is useful for initial user authorization to access IHS resources. Each authentication level may exhibit a different level of robustness. However, initial authentication alone may leave an IHS vulnerable to unauthorized access because unauthorized users may potentially circumvent this initial security measure with viruses, malicious Internet bots, physical snooping, or other measures.

In one embodiment, an IHS includes a security tool that performs authentication operations, i.e. verification operations, on a user or users of the IHS. The security tool may perform active and/or passive authentication. In other words, the user may be aware of active authentication, such as questioning the user for passwords, requesting fingerprint analysis, retinal scanning and other active authentication methods during active authentication mode operations. However, the user may not be aware of passive authentication, such as passive analysis of textual input patterns from the user and/or passive analysis of biometric facial recognition during passive authentication mode operations. Passive analysis provides non-disruptive security testing of users to authenticate such users. The security tool may combine both an active authentication mode and a passive authentication mode to provide broader security features before and during IHS access. The security tool may analyze environmental factors such as user IP addresses before and/or during user transactions. Environmental factors may include physical aspects of the user's surroundings. For example, another environmental factor that the security tool may analyze is user location background. In other words, the security tool may digitally image the background surroundings of the user during user transactions. For example, the security tool may analyze the number of faces in a digital image including the user and determine if the image is in a public or private setting and adjust authentication levels in response to this input. In response to determining whether the user is in a public location or a private location, the security tool may adjust the authorization level of the transaction. For example, the security tool may invoke a higher authorization level with more robust authentication if the tool determines that the user is in a public location than if the tool determines that the user is in a private location. The security tool may analyze the number of voices as input during user transactions and determine if the user is at a public location or a private location. The security tool may adjust or otherwise modify security features such as the authentication level in response to environmental factors such as the number of voices detected.

As discussed in more detail below, the security tool may authenticate a user by either a passive authentication analysis test such as keyboard typing keystroke analysis or an active authentication analyses test such as a retinal scan of the user. A particular passive analysis test and a particular active analysis test may each exhibit a different authentication level. In one embodiment, the security tool may switch from a passive authentication mode to an active authentication mode in response to an authentication failure in at least one of the re-authentication tests that follow an initial authentication.

In addition to initial authentication, an IHS security tool may apply continued user authentication tests after the initial authentication to provide security measures after a user logs into an IHS and/or when a user executes an IHS application. For example, after the initial authentication an IHS security tool may perform periodic, aperiodic and/or randomly timed user authentications, such as asking the user to answer personal questions. Examples of such personal questions include requesting social security number verification, mother's maiden name verification, organization-related questions such as business-related questions, and other questions requiring answers that are personally known by a particular user. In one embodiment, after initial authentication an IHS may perform re-authentication of the user at any time during user transactions and may modify the strength of the authentication by using different authentication levels. The authentication level that such re-authentication employs may vary in response to an observed confidence level of a current authentication of the user. A large drop in the current observed confidence level during re-authentication may result in a higher authentication level test than a more moderate change in the current observed confidence level.

Unauthorized access to user and/or IHS information is of great concern to corporate entities and other organizational entities. Ideally, security tools prevent unauthorized access to secure information. However, in some cases unauthorized access goes unnoticed for some time before security measures take effect. In these cases, security tools would ideally detect unauthorized access as soon as possible and reduce the threat by terminating transactions or other actions. Once an unauthorized user gains access to IHS resources, the unauthorized use may be difficult to detect. For example, an unauthorized user may gain access to an IHS by employing a terminal from which an authorized user logged into the IHS if that authorized user left the terminal in an unsecure state. In this case, the disclosed security tool may flag, or otherwise announce, the unauthorized user by identifying the unauthorized user through that user's actions, such as the user's input text patterns, word use, or other active and/or passive tests. The security tool may display a notice of security breach when such a security breach occurs.

In one embodiment, the disclosed IHS security tool may provide multiple authentication levels to reduce the risk of security breaches. For example, a requirement of submitting a password upon login may be one authentication. A next authentication level may require responsive answers to challenge questions. Another next authentication level may involve fingerprint or facial biometric analysis or other security measures. The security tool may interpret a user's attribute history as described below to determine appropriate authentication levels. "User attributes" refer to characteristics of a particular user that are unique to the particular user when the particular user interacts with the IHS. For example, a particular user may type at a typing rate of 60 words per minutes 90% of the time. Another user may type at 80 words per minute 70% of the time. "User attribute history" is a stored record of the user attributes that a particular user exhibits as that user interacts with the IHS.

One user may type with a first inter-character time spacing while another user types with a second inter-character time spacing. Inter-character time spacing is the average time between typed characters that a particular user exhibits. Typing words per minute and inter-character time spacing are examples of user attributes that the user attribute history may record and associate with a particular user. Other representative user attributes include a count of the number of times the user requests a particular application per unit of time and what type of application, and/or the specific application, that the user typically requests when accessing the IHS. The security tool may store user attribute information for a particular user over time to generate the user attribute history for that particular user. In actual practice, the security tool may store user attribute histories for several users. The security tool may use this user attribute history of a particular user as well as other historical information, such as learned information about the user, to determine appropriate authentication levels, for a particular user. The security tool may modify the authentication level based upon learned information with respect to a particular user as learned from user transactions and/or other sources. The user history that the security tool stores for each user may be attribute information that the security tool learns as the user interacts with the security tool over time. Such a user attribute history may thus be a learned user attribute history.

In one embodiment of the disclosed secure transaction method, the security tool performs dynamic, multi-layered continuous authentication in real time to provide safe, secure and confidential transactions. The security tool may identify a relationship between users, such as an organizational relationship of multiple interacting users, to determine the best security measures to invoke to protect user-to-user transactions. The security tool may include the learned user attribute history described above. This learned user attribute history is an accumulated historical knowledge base of learned information that pertains to users. The learned user attribute history may include the applications, types of transactions, and other user attribute information associated with a particular user. The learned user attribute history may also include the user name or other identifying information for a user with whom the particular user regularly communicates. The learned user attribute history information may indicate if a current communication is the first communication with another user or one of many communications with another user over time. The learned user attribute history may associate different user attributes with different users. During user transactions, the security tool may employ this knowledge base of information in real time to make dynamic security changes and adjustments such as those relating to change of authentication levels and change of other security measures.

One transaction to which the disclosed methodology applies is textual communication between interacting users such as instant messaging. In one embodiment, an initiating user initiates an instant messaging application within an IHS and an interacting user comes online to communicate with the initiating user. It is desirable to protect these communications of information due to their often confidential and sensitive nature. Providing secure transactions with periodic, aperiodic and/or randomly timed changes in authentication level increases the likelihood of blocking unauthorized access. These changes in authentication level, i.e. the particular type of authentication test, may be in response to an observed change or variation in the user's current on-line behavior as compared to the user's normal base-line behavior that the learned user attribute history may store. Moreover, providing continuous and/or substantially continuous authentication likewise increases the likelihood of blocking unauthorized access. In this manner, the security tool provides substantially continuous re-authentication of the user after initial authentication. The disclosed transaction security method facilitates secure and confidential information sharing between users.

FIG. 1 shows an information handling system (IHS) 100 including a security tool 180 that employs the disclosed transaction security methodology. In one embodiment, IHS 100 may include an operating system OS 185, an application 190, and a security information store 300. In one embodiment, IHS 100 may be a server or other system that provides user access for user transactions, such as user-to-user communications or other operations. IHS 100 includes a processor 105. In one embodiment, processor 105 may include multiple processor cores (not shown). IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array.

Processor 105 may also include local memory (not shown) such as L1 and L2 caches (not shown). A video graphics controller 130 couples a display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. Network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system. IHS 100 may take other form factors such as a gaming device, a personal digital assistant (PDA), a portable telephone device, a communication device or other devices that include a processor and memory.

IHS 100 employs OS 185 that may store information on nonvolatile storage 140. IHS 100 includes a computer program product on digital media 175 such as a CD, DVD or other media. In one embodiment, a designer or other entity configures the computer program product with security tool 180 to practice the disclosed transaction security methodology. In practice, IHS 100 may store security tool 180 on nonvolatile storage 140 as security tool 180'. Nonvolatile storage 140 may store OS 185, application 190, and security information store 300. When IHS 100 initializes, the IHS loads security tool 180, OS 185, application 190, and security information store 300 into system memory 125 for execution as security tool 180", OS 185', application 190', and security information store 300', respectively. In accordance with the disclosed methodology, IHS 100 may employ security tool 180 to manage user transaction security.

Figure 2:
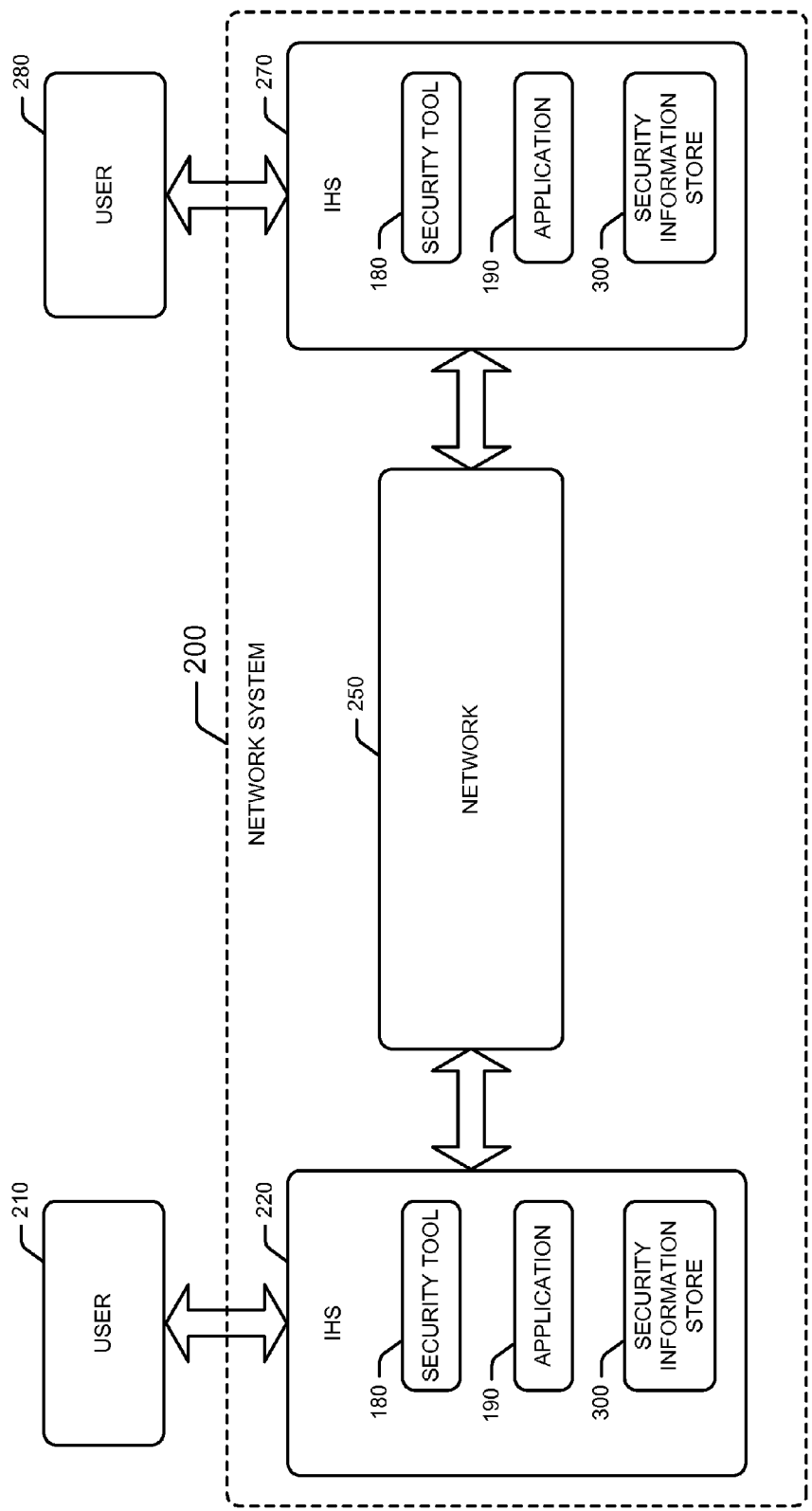
FIG. 2 shows a network system that includes IHSs that employ the disclosed transaction security methodology.

FIG. 2 is a block diagram of a network system 200 that employs the disclosed transaction security method. Network system 200 enables multiple users to access IHS resources that provide user-to-user transactions as well as other operations. Network system 200 includes an IHS 220 that a user 210 may employ. As stated above in the definition of "user", user 210 may include a human user or other entity such as an IHS. For example, user 210 may include an IHS that executes an application that requires communication with another user. In this example, user 210 may take the form of IHS 100. Similarly, user 280 may take the form of another IHS 100. IHS 220 may be one form of IHS 100 that includes security tool 180, application 190, and security information store 300. IHS 220 may include any features of IHS 100 in form or function. IHS 220 couples to a network 250 that couples to another IHS 270. IHS 270 may be one form of IHS 100 that includes security tool 180, application 190, and security information store 300 that user 280 employs. IHS 270 may include any features of IHS 100 in form or function.

Network 250 may include network resources (not shown) that provide communication between IHS 220 and IHS 270. In one embodiment, network 250 is a wired or wireless network for communication between IHS 220 and IHS 270 that provides for communication between user 210 and user 280. User 210 may communicate with user 280 by employing the resources of IHS 220, network 250 and IHS 270. In a similar manner, user 280 may communicate with user 210 by employing IHS 270, network 250 and IHS 220. User communications may include communications from applications such as instant messaging, IHS database queries, or other transactions as described in more detail below. In one embodiment, IHS 220 and IHS 270 employ their respective applications 190 to perform secure transactions such as instant messaging communications or other transactions as described in more detail below.

Figure 3:
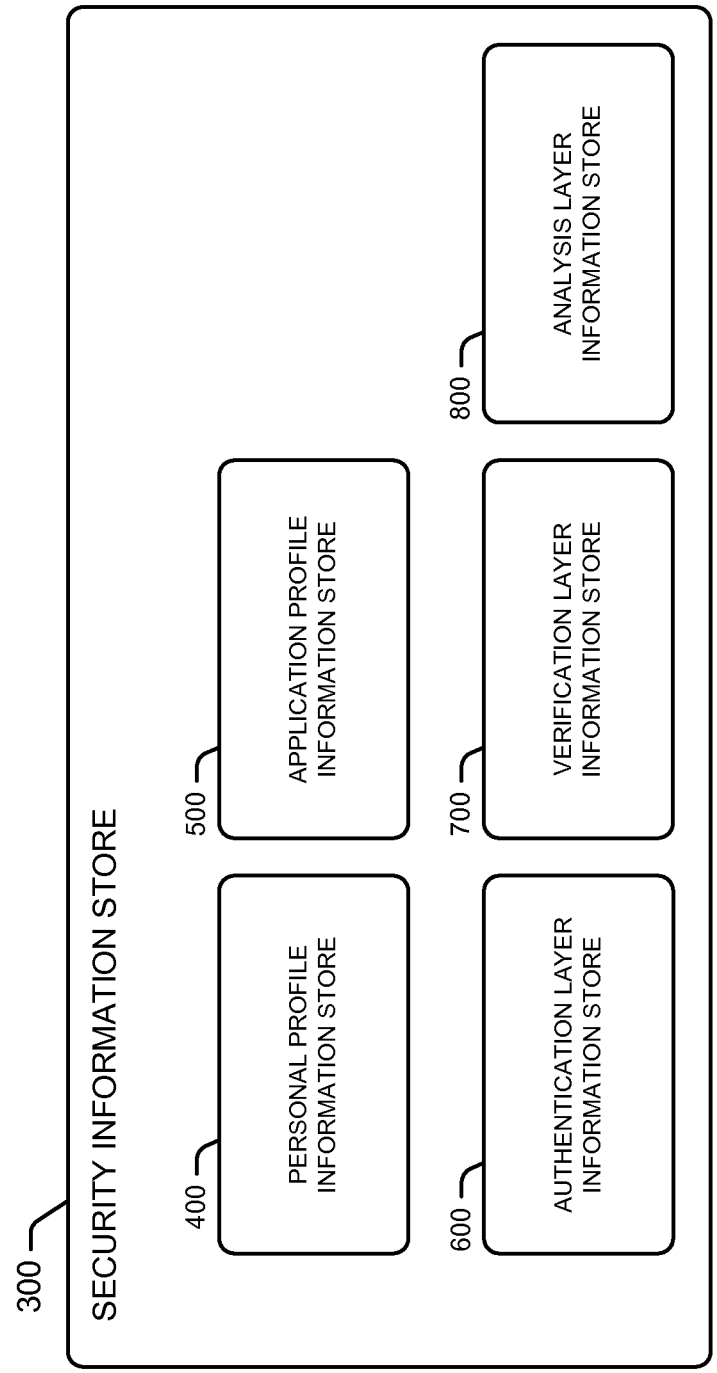
FIG. 3 depicts a security information store that a security tool employs to practice the disclosed transaction security methodology.

FIG. 3 is a diagram of a security information store 300 that security tool 180 employs to practice the disclosed transaction security method. In more detail, security tool 180 employs security information store 300 to store security information that relates to transactions within network system 200 between multiple users, such as user 210 and user 280. Security tool 180 may store and retrieve information from security information store 300 while practicing the disclosed transaction security method. Security information store 300 includes a personal profile information store 400, an application profile information store 500, an authentication layer information store 600, a verification layer information store 700 and an analysis layer information store 800, all described in more detail below.

FIG. 4 is a diagram showing more detail of personal profile information store 400 of FIG. 3. Personal profile information store 400 includes personal profile information 405 that describes attributes of the particular users and corresponding transactions of network system 200. These attributes may be referred to as "user attributes". Personal profile information 405 includes user information that security tool 180 employs during implementation of the disclosed transaction security method. In the embodiment of FIG. 4, personal profile information store 400 arranges personal profile information 405 in cells that form a matrix of rows 461, 462, 463, 464 and columns 451, 452, 453 . . . 459. Each row 461, 462, 463, 464 corresponds to a different initiating user. An "initiating user" is a user who initiates a transaction, such as a communication, with another user, namely an "interacting user". Each column 451, 452, 453 . . . 459 corresponds to a different user attribute. Rows 461, 462, 463, 464 may be referred to as "user rows", and columns 451, 452, 453 . . . 459 may be referred to as "user attribute columns". Other embodiments may include a larger or smaller number of user rows and attribute columns depending on the number of users and the number of user attributes that personal profile information 405 employs for a particular transaction.

For an initiating user that network system 200 associates with a particular row of personal profile information store 400, there are corresponding column entries of user attribute information in attribute columns 451, 452, . . . 459. For example, user row 461 includes nine (9) user attribute entries in the respective nine (9) columns thereof. More specifically, user row 461 stores an initiating user personal ID "4567" in personal ID column 451, a name "AAAA" in name column 452, and an organization "SUPPLY CHAIN" for the associated initiating user in organization column 453. These three attribute columns, namely personal ID, name and organization together form an initiating user personal ID key 410 that is unique to the particular initiating user to which row 461 corresponds. In one embodiment, these three attribute columns identify the initiating user that initiates a particular transaction with an interacting user. User row 461 also stores an interacting user ID "3234" in the interacting user ID column 454 of that row. The interacting user ID "3234" is the user ID of the particular interacting user with whom the initiating user "4567" communicates in the transaction that row 461 describes.

User row 461 also stores the following user attribute entries that correspond to a communication between the particular initiating user and interacting user associated with user row 461, namely a relationship ID "R567" in relationship ID column 455, a relationship name "CO-WORKER" in relationship name column 456, a communication nature "INFORMAL" in communication nature column 457, an authentication ID "A234" in authentication ID column 458 and a default security level "1" in default security level column 459. In one embodiment, the default security level applies to both the initiating user and the interacting user of a particular transaction. If security tool 180 generates history information, such as learned behavior for the initiating user and interacting user then the security tool may employ that information to establish authentication levels. Network system 200 generates authentication ID 458 in response to the initiating user initiating a particular transaction with the interacting user corresponding to a particular row of personal profile information store 400. In this manner, security tool 180 may generate and track a particular transaction by the authentication ID number that remains consistent during all authentications of the particular transaction. The default security level corresponds to the relationship between the initiating user and the interacting user. Security tool 180 may modify the security level during subsequent authentications. For example, if during a subsequent authentication of a user the observed confidence level in the authentication of that particular user increases, then security tool 180 may increase the security level of that user to provide an appropriate increase in the amount and/or type of information that user may access.

Two of these attribute columns, namely authentication ID 458 and default security level 459, together form an authentication key 420 that is unique to the particular initiating user to which row 461 corresponds as well as the authentication information for the transaction between this initiating user and this interacting user. In one embodiment, these two attribute columns identify authentication information for the initiating user as well as authentication information for the interacting user for the particular transaction that row 461 describes. As shown in more detail below, authentication key 420 may be common to each store within security information store 300, namely personal profile information store 400, application profile information store 500, authentication layer information store 600, verification layer information store 700, and analysis layer information store 800. In this manner, authentication key 420 links each row of data within each store of security information store 300 with each other store within security information store 300.

Still referring to the user rows and attribute columns of FIG. 4, user row 462 includes information that describes another initiating user to interacting user transaction. User row 462 includes nine (9) user attribute entries in the respective nine (9) columns thereof. More specifically, user row 462 stores a personal ID "5687" in personal ID column 451, a name "BBBB" in name column 452, and an organization "DEVELOPMENT" in organization column 453. User row 462 also stores an interacting user ID "5677" in the interacting user ID column 454 of that row. The interacting user ID "5677" is the user ID of the particular interacting user with whom the initiating user "5687" communicates in the transaction that row 462 describes.

User row 462 also stores the following user attribute entries that correspond to a communication between the particular initiating user and interacting user associated with user row 462, namely a relationship ID "R687" in relationship ID column 455, a relationship name "MANAGER" in relationship name column 456, a communication nature "FORMAL" in communication nature column 457, an authentication ID "R566" in authentication ID column 458 and a default security level "2" in default security level column 459. User row 463 includes information that describes another initiating user to interacting user transaction. User row 463 includes nine (9) user attribute entries in the respective nine (9) columns thereof. More specifically, user row 463 stores a personal ID "3456" in personal ID column 451, a name "CCCC" in name column 452, and an organization "SALES" in organization column 453. User row 463 also stores an interacting user ID "3322" in the interacting user ID column 454 of that row. The interacting user ID "3322" is the user ID of the particular interacting user with whom the initiating user "3456" communicates in the transaction that row 463 describes.

User row 463 also stores the following user attribute entries that correspond to a communication between the particular initiating user and interacting user associated with user row 463, namely a relationship ID "R456" in relationship ID column 455, a relationship name "SENIOR MANAGER" in relationship name column 456, a communication nature "CONFIDENTIAL" in communication nature column 457, an authentication ID "T567" in authentication ID column 458 and a default security level "3" in default security level column 459. User row 464 includes information that describes yet another initiating user to interacting user transaction. User row 464 includes nine (9) user attribute entries in the respective nine (9) columns thereof. More specifically, user row 464 stores a personal ID "4566" in personal ID column 451, a name "DDDD" in name column 452, and an organization "FINANCE" in organization column 453. User row 464 also stores an interacting user ID "2144" in the interacting user ID column 454 of that row. The interacting user ID "2144" is the user ID of the particular interacting user with whom the initiating user "4566" communicates in the transaction that row 464 describes.

User row 464 also stores the following user attribute entries that correspond to a communication between the particular initiating user and interacting user associated with user row 464, namely a relationship ID "R566" in relationship ID column 455, a relationship name "MENTOR" in relationship name column 456, a communication nature "INFORMAL" in communication nature column 457, an authentication ID "Y4567" in authentication ID column 458 and a default security level "1" in default security level column 459.

In one example, as shown from left to right of FIG. 4, columns 451, 452 . . . 459, and user row 461 include information that corresponds to a transaction wherein the initiating user with a personal ID of "4567" and a name of "AAAA" from organization "SUPPLY CHAIN" initiates a transaction or communication with interacting user "3234". Interacting user "3234" has a relationship ID of R567 and relationship name of "CO-WORKER" with initiating user "4567" and a communication nature of "INFORMAL" with the initiating user. The transaction that row 461 describes provides an authentication ID of "A234" with a default security level of "1".

As described in detail above, each row of personal profile information 405 corresponds to a particular initiating user, interacting user, and transaction. Security tool 180 may use the information within personal profile information store 400 to determine the relationship between the initiating user and the interacting user as well as other attributes of the initiating user to interacting user transaction (user-to-user transaction). As shown in the information of authentication key 420, each transaction includes corresponding authentication information. Security tool 180 may employ authentication information as shown in authentication key 420 to assist in determining security attribute information for each particular transaction. For example, as shown in more detail below, security tool 180 may use the information in authentication key 420 to map to information within other stores of security information store 300. In this manner, security tool 180 may employ authentication key 420 as a pointer to other security attribute information during authentication operations.

FIG. 5 is a diagram showing more detail of application profile information store 500 of FIG. 3 above. Application profile information store 500 includes application profile information 505 that describes attributes of the particular applications and corresponding transactions of network system 200. These attributes may be referred to as "application attributes". Application profile information 505 includes application information that security tool 180 employs during implementation of the disclosed transaction security method. In the embodiment of FIG. 5, application profile information store 500 arranges application profile information 505 in cells that form a matrix of rows 561, 562, 563, 564 and columns 551, 552, 553 . . . 560. Each row 561, 562, 563, 564 corresponds to a different application. An "initiating user" as described above may initiate a transaction by employing an "application" such as application 190. Each column 551, 552, 553 . . . 560 corresponds to a different application attribute. Rows 561, 562, 563, 564 may be referred to as "application rows" and columns 551, 552, 553 . . . 560 may be referred to as "application attribute columns". Other embodiments may include a larger or smaller number of application rows and attribute columns depending on the number of applications and the number of application attributes that application profile information 505 employs for a particular transaction.

For an application that associates with a particular row of application profile information store 500, there are corresponding column entries of application attribute information in attribute columns 551, 552, . . . 560. For example, application row 561 includes ten (10) application attribute entries in the respective ten (10) columns thereof. More specifically, application row 561 stores an application name "INSTANT MESSAGING APPLICATON" in application name column 551, and an application ID "ST456" in application ID column 552. These 2 attribute columns 551 and 552, namely application name and application ID, together form an application ID key 510 that is unique to the particular application to which row 561 corresponds.

Application row 561 stores an initiating user personal ID "4567" in personal ID column 553, a name "AAAA" in name column 554 and an organization "SUPPLY CHAIN" in organization column 555. These three attribute columns, namely personal ID, name and organization together form an initiating user personal ID key 410. In one embodiment, the information within initiating user personal ID key 410 is identical to that within personal ID key 410 of personal profile information store 400. In this manner, each application row of application profile information 505 corresponds to a particular initiating user and the particular application to which row 561 corresponds. Application row 561 also stores a job role "PROCESS ENGINEER" in the job role column 556 of that row.

Application row 561 also stores the following application attribute entries that correspond to a communication between a particular initiating user and a particular interacting user associated with application row 561, namely a privileges "USER" attribute entry in privileges column 557, a threshold "FILESIZE<300 MB" attribute entry in threshold column 558, an authentication ID "A234" attribute entry in authentication ID column 559 and a default security level "1" attribute entry in default security level column 560.

Two of these attribute columns, namely authentication ID 559 and default security level 560 together form an authentication key 420 that is unique to the particular application to which row 561 corresponds. In one embodiment, the information within authentication key 420 in personal profile information store 400 is identical to the authentication key 420 information within application profile information store 500. In one embodiment, these two attribute columns identify authentication information for the initiating user as well as authentication information for the interacting user for the particular application that row 561 describes. For example, the authentication key 420 information may provide mapping to personal profile information store 400 that provides interacting user relationship information to that of the initiating user, as well as other authentication information.

Still referring to FIG. 5, application row 562 includes information that describes another application and corresponding transaction. Application row 562 includes ten (10) application attribute entries in the respective ten (10) columns thereof. More specifically, application row 562 stores an application name "MANUFACTURING APPLICATON" in application name column 551, and an application ID "MF254" in application ID column 552. Application row 562 stores an initiating user personal ID "5687" in personal ID column 553, a name "BBBB" in name column 554, and an organization "DEVELOPMENT" in organization column 555. Application row 562 also stores a job role "CARD DEVELOPER" in the job role column 556 of that row.

Application row 562 also stores the following application attribute entries that correspond to a communication between a particular initiating user and interacting user associated with application row 561, namely a privileges "ADVANCED USER" in privileges column 557, a threshold "PART<$10,000" in threshold column 558, an authentication ID "R567" in authentication ID column 559 and a default security level "3" in default security level column 560.

Application row 563 includes information that describes another application and corresponding transaction. Application row 563 includes ten (10) application attribute entries in the respective ten (10) columns thereof. More specifically, application row 563 stores an application name "SALES APPLICATON" in application name column 551, and an application ID "F7893" in application ID column 552. Application row 563 stores an initiating user personal ID "3456" in personal ID column 553, a name "CCCC" in name column 554, and an organization "SALES" in organization column 555. Application row 563 also stores a job role "MIDWEST REGION LEAD" in the job role column 556 of that row.

Application row 563 further stores the following application attribute entries that correspond to a communication between a particular initiating user and interacting user associated with application row 563, namely a privileges "ADMIN" in privileges column 557, a threshold "MONITOR<500 USERS" in threshold column 558, an authentication ID "A678" in authentication ID column 559 and a default security level "4" in default security level column 560.

Application row 564 includes information that describes another application and corresponding transaction. Application row 564 includes ten (10) application attribute entries in the respective ten (10) columns thereof. More specifically, application row 563 stores an application name "FINANCE APPLICATION" in application name column 551, and an application ID "S5637" in application ID column 552. Application row 563 stores an initiating user personal ID "4566" in personal ID column 553, a name "DDDD" in name column 554, and an organization "FINANCE" in organization column 555. Application row 563 also stores a job role "COST ACCOUNTANT" in the job role column 556 of that row. Application row 564 also stores the following application attribute entries that correspond to a communication between a particular initiating user and interacting user associated with application row 564, namely a privileges "USER" in privileges column 557, a threshold "CUSTOMER REV<$20 MILLION" in threshold column 558, an authentication ID "G456" in authentication ID column 559 and a default security level "4" in default security level column 560.

In one example, as shown from left to right, columns 551, 552 ... 560, and application row 561 include information that corresponds to a transaction wherein the application is an "INSTANT MESSAGING APPLICATION" with an application ID of "ST456". The initiating user with a personal ID of "4567" and name of "AAAA" belongs to organization "SUPPLY CHAIN". The initiating user's job role is "PROCESS ENGINEER" with privileges of "USER". The application threshold is "FILESIZE<300 MB". In other words, the application may include a security threshold that the initiating user and application may not move beyond. These are typically limits set in advance by designers or other entities to provide a protection or limit that the application may not move beyond during execution without special exceptions or user intervention. In one embodiment, security tool 180 may modify the threshold or limit information during transaction operations. Security tool 180 may employ information, such as the relationship of the users, an observed confidence level of the transaction, as well as other factors to determine security threshold and limits.

The observed confidence level is a measure of security tool 180 that describes the amount of confidence that a particular user's identity is valid. Stated alternatively, the observed confidence level is a measure of the degree of certainty in the correctness of the authentication of a particular user by security tool 180. The observed confidence level with respect to a particular user may change over time such as during a particular transaction and/or over multiple transactions. The determination of the observed confidence level, i.e. the level of certainty with respect to the correctness of the authentication of the particular user's identity, is discussed in more detail below in reference to the flowchart of FIG. 10A. Continuing with application row 561, the application transaction corresponds to an authentication ID of "A234" and a default security level of "1".

As described in detail above, each row of application profile information 505 corresponds to a particular application that includes initiating user information, authentication information and other application information. Security tool 180 may use the information within application profile information store 500 to determine the relationship between the application, the initiating user as well as other attributes of the application corresponding to the initiating user to interacting user transaction. As shown in the information of authentication key 420, each transaction includes corresponding authentication information. Security tool 180 may employ authentication information as shown in authentication key 420 to assist in determining security attribute information for each particular transaction.

FIG. 6 is a diagram showing more detail of authentication layer information store 600 of FIG. 3 above. The term "layer" as used herein refers to reference levels of authentication, i.e. reference levels of verification. Layers represent dynamic authentication and verification based on unique relationships and learned behavior information. Examples of such "layers" include learned behavior layers that security tool 180 may employ during continuous learning of user actions during user transactions. Learned behavior layers may include unique user factors, such as conversation, relationships, work style, language use, facial biometrics, fingerprint biometrics, and other unique learned user factors that may change over time. The term "authentication layer" as used here refers to authentication layer information that the security tool employs during user validation, verification, and other user transaction security operations. A passive authentication layer includes information that security tool determines and/or learns in the background during user transactions, such as user historical information from passive text analysis or other passive tests. An active authentication layer includes information that security tool 180 determines and/or learns in the foreground during user transactions, such as historical information from user responses to security questions that the security tool 180 presents to the user. Authentication layer information store 600 includes authentication layer information 605 that describes authentication attributes of the particular applications and corresponding transactions of network system 200. These attributes may be referred to as "authentication attributes".

Authentication layer information 605 includes authentication information that security tool 180 employs during implementation of the disclosed transaction security method. In the embodiment of FIG. 6, authentication layer information store 600 arranges authentication layer information 605 in cells that form a matrix of rows 661, 662, 663, 664 and columns 651, 652, 653 . . . 660. Each row 661, 662, 663, 664 corresponds to a different authentication. An "initiating user" as described above may initiate a transaction by employing an "application", such as application 190, that corresponds to a particular "authentication". Each column 651, 652, 653 . . . 660 corresponds to a different authentication attribute. Rows 661, 662, 663, 664 may be referred to as "authentication rows" and columns 651, 652, 653 . . . 660 may be referred to as "authentication attribute columns". Other embodiments may include a larger or smaller number of authentication rows and attribute columns depending on the number of authentications and the number of authentication attributes that authentication layer information 605 employs for a particular transaction.

For an authentication that associates with a particular row of authentication layer information store 600, there are corresponding column entries of authentication attribute information in attribute columns 651, 652, . . . 660. For example, authentication row 661 includes ten (10) authentication attribute entries in the respective ten (10) columns thereof. More specifically, authentication row 661 stores an authentication ID "A234" in authentication ID column 651 and a default security level "1" in default security level column 652. These 2 attribute columns, namely authentication ID and default security level, form an authentication key 420 that is unique to the particular authentication to which row 661 corresponds. In one embodiment, authentication key 420 is identical to the authentication key 420 within personal profile information store 400 and application profile information store 500.

Authentication row 661 stores an authentication name "PASSWORD" in authentication name column 653, an authentication method "STATIC" in authentication method column 654, and an authentication type "ACTIVE" in authentication type column 655. Authentication row 661 stores an application name "INSTANT MESSAGING APPLICATION" in the application name column 656 and an application ID "ST456" in the application ID column 657 of row 661.

Two of these attribute columns, namely application name and application ID, together form an application ID key 510. In one embodiment, application ID key 510 is identical to the application ID key 510 information within application profile information store 500. Authentication row 661 also stores the following authentication attribute entry that corresponds to an application and communication between a particular initiating user and interacting user associated with authentication row 661, namely a frequency "20 MIN" in frequency column 658. This frequency information may provide authentication repetition rate information to security tool 180. For example, a particular application may require authentication or password testing every 20 minutes. In one embodiment wherein the frequency of authentication is not fixed, security tool 180 may determine the need for authentication timing from transaction information, such as the relationship between the users, the observed confidence level of the transaction, as well as other factors.

Authentication row 661 also stores a key indicator "REPEAT WORD>10/MIN" in key indicator column 659.

Key indicator information may provide authentication or security information to allow security tool 180 to identify exception activity. Exception activity refers to a user activity that falls outside of activity that security tool 180 may define as normal user activity, such as a baseline user activity. For example, security tool 180 may monitor a particular initiating user and application and determine that an initiating user or application repeats any particular word more than 10 times within a period of one minute. In that case, security tool 180 may regard that word repetition as exception activity that requires special action, such as increasing authentication levels for that particular application and the initiating user to interacting user transaction. Authentication row 661 stores user definitions in column 660. Users may store or otherwise populate special or unique authentication attribute definitions for any particular application. The user definitions column is intentionally left blank in this particular example, but is fillable by the user at his or her option.

Still referring to FIG. 6, authentication row 662 includes information that describes another authentication, namely "authentication ID R567" and the corresponding transaction, namely a "manufacturing application" transaction. Authentication row 662 includes ten (10) authentication attribute entries in the respective ten (10) columns thereof. More specifically, authentication row 662 stores an authentication ID "R567" in authentication ID column 651, and a default security level "3" in default security level column 652. Authentication row 662 also stores an authentication name "TEXT ANALYSIS" in authentication name column 653, an authentication method "DYNAMIC" in authentication method column 654, and an authentication type "PASSIVE" in authentication type column 655. Authentication row 662 stores an application name "MANUFACTURING APPLICATION" in the application name column 656 and an application ID "MF254" in the application ID column 657 of row 662.

Authentication row 662 further stores the following authentication attribute information that corresponds to an application and communication between a particular initiating user and interacting user associated with authentication row 662, namely a frequency "1 HR" in frequency column 658. Authentication row 662 also stores key indicator information in key indicator column 659. In this particular example, key indicator information in key indicator column 659 is intentionally left blank. Authentication row 662 also stores user definitions information in user definitions column 660. In this particular example, user definitions information in user definitions column 660 is intentionally left blank.

Authentication row 663 includes information that describes another authentication, namely "authentication ID A678" and the corresponding transaction, namely a "sales application" transaction. Authentication row 663 includes ten (10) authentication attribute entries in the respective ten (10) columns thereof. More specifically, authentication row 663 stores an authentication ID "A678" in authentication ID column 651, and a default security level "4" in default security level column 652

Authentication row 663 stores an authentication name "FINGERPRINT BIOMETRIC" in authentication name column 653, an authentication method "DYNAMIC" in authentication method column 654, and an authentication type "ACTIVE" in authentication type column 655. Authentication row 663 stores an application name "SALES APPLICATION" in the application name column 656 and an application ID "F7893" in the application ID column 657 of row 663.

Authentication row 663 also stores the following authentication attribute information that corresponds to an application and communication between a particular initiating user and interacting user associated with authentication row 663, namely a frequency "1 HR" in frequency column 658. Authentication row 663 also stores key indicator information in key indicator column 659 and user definitions information in user definitions column 660. In this particular example, the key indicator information in key indicator column 659 and the user definitions information in user definitions column 660 are intentionally left blank.

Authentication row 664 includes information that describes another authentication, namely the "authentication ID G456" and corresponding transaction, namely a "finance application" transaction. Authentication row 664 includes ten (10) authentication attribute entries in the respective ten (10) columns thereof. More specifically, authentication row 664 stores an authentication ID "G456" in authentication ID column 651, and a default security level "4" in default security level column 652.

Authentication row 664 stores an authentication name "FACIAL RECOGNITION BIOMETRIC" in authentication name column 653, an authentication method "DYNAMIC" in authentication method column 654, and an authentication type "PASSIVE" in authentication type column 655. Authentication row 664 stores an application name "FINANCE APPLICATION" in the application name column 656 and an application ID "S5637" in the application ID column 657 of row 664.

Authentication row 664 also stores the following authentication attribute information that corresponds to an application and communication between a particular initiating user and interacting user associated with authentication row 664, namely a frequency "1 HR" in frequency column 658. Authentication row 664 also stores key indicator information in key indicator column 659 and user definitions information in user definitions column 660. In this particular example, the key indicator information in key indicator column 659 and the user definitions information in user definitions column 660 are intentionally left blank.

In one example, as shown from left to right in FIG. 6, columns 651, 652 . . . 660 and authentication row 661 include information that corresponds to a transaction wherein the authentication ID is "A234" with a default security level of "1". The authentication name is "PASSWORD", the authentication method is "STATIC" and the authentication type is "ACTIVE". The application name is "INSTANT MESSAGING APPLICATION" with an application ID of "ST456". The authentication frequency is "20 MIN" with a key indicator of "REPEAT WORD>10/MIN" and no user definitions defined. In other words, the application that corresponds to authentication row 651, namely instant messaging, requires password authentication and may include authentication security features, such as authentication every 20 minutes.

As described in detail above, each row of authentication layer information 605 corresponds to a particular authentication that includes application information and other authentication information. Security tool 180 may use the information within authentication layer information store 600 to determine the relationship between the authentication, the initiating user and other attributes of the authentication corresponding to the initiating user to interacting user transaction. As shown in the information of authentication key 420, each transaction includes corresponding authentication information. Security tool 180 may employ authentication information as shown in authentication key 420 to assist in determining security attribute information that corresponds to each particular transaction.

Figure 7:
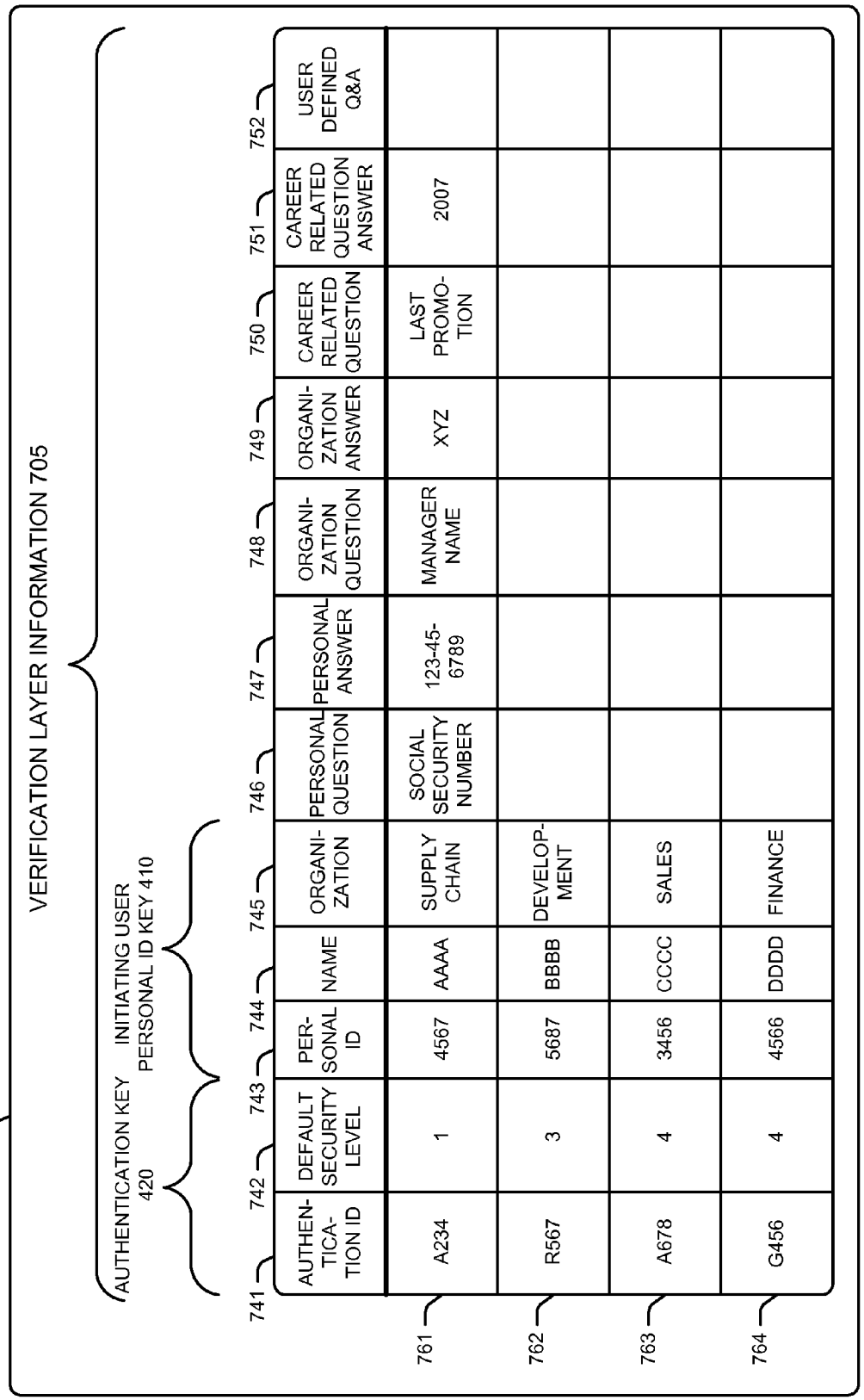
FIG. 7 shows a verification layer information store that a security tool employs to practice the disclosed transaction security methodology.

FIG. 7 is a diagram showing more detail of verification layer information store 700 of FIG. 3 above. Verification layer information store 700 includes verification layer information 705 that describes verification attributes of the transactions of network system 200, such as those transactions between the initiating user and the interacting user. These attributes may be referred to as "verification attributes". Verification layer information 705 includes verification information that security tool 180 employs during implementation of the disclosed transaction security method. In the embodiment of FIG. 7, verification layer information store 700 arranges verification layer information 705 in cells that form a matrix of rows 761, 762, 763, 764 and columns 741, 742, 743 . . . 752. Each row 761, 762, 763, 764 corresponds to a different verification and authentication ID 741. An "initiating user" as described above may initiate a transaction by employing an "application" such as application 190 that corresponds to a particular authentication ID, such as shown in authentication ID 741. Each column 741, 742, 743 . . . 752 corresponds to a different verification attribute. Rows 761, 762, 763, 764 may be referred to as "verification rows" and columns 741, 742, 743 . . . 752 may be referred to as "verification attribute columns". Other embodiments may include a larger or smaller number of verification rows and attribute columns depending on the number of verifications and the number of verification attributes that verification layer information 705 employs for a particular transaction.

For an authentication that associates with a particular row of verification layer information store 700, there are corresponding column entries of verification attribute information in attribute columns 741, 742, . . . 752. For example, verification row 761 includes twelve (12) verification attribute entries in the respective twelve (12) columns thereof. More specifically, verification row 761 stores an authentication ID "A234" in authentication ID column 741 and a default security level "1" in default security level column 742. These 2 attribute columns, namely authentication ID and default security level, form an authentication key 420 that is unique to the particular transaction verification to which row 761 corresponds. In one embodiment, authentication key 420 is identical to the authentication key 420 within personal profile information store 400, application profile information store 500 and authentication layer information store 600. As described above, authentication key 420 provides security tool 180 with a mapping between the different stores within security information store 300. This mapping provides authentication information that corresponds to a particular initiating user to interacting user transaction.

Verification row 761 stores a personal ID "4567" in personal ID column 743, a name "AAAA" in name column 744, and an organization "SUPPLY CHAIN" in organization column 745. These 3 verification attribute columns, namely personal ID, name and organization, together form an initiating user personal ID key 410 that is unique to the particular transaction verification to which row 761 corresponds. In one embodiment, initiating user personal ID key 410 is identical to the initiating user personal ID key 410 within personal profile information store 400 and application profile information store 500. Security tool 180 may employ identical personal ID key 410 to map the authentication information between personal profile information store 400, application profile information store 500 and verification layer information store 700. Verification row 761 stores a personal question "SOCIAL SECURITY NUMBER" in the personal question column 746 and a corresponding personal answer "123-45-6789" in the personal answer column 747. Verification row 761 stores a organization question "MANAGER NAME" in the organization question column 748 and a corresponding organization answer "XYZ" in the organization answer column 749.

Verification row 761 stores a career related question "LAST PROMOTION" in the career related question column 750 and a corresponding career related answer "2007" in the career related answer column 751. Verification row 760 stores user defined Q&A information in user defined Q&A column 752. In one embodiment, users may populate the information within verification row 761 and user defined Q&A column 752 with uniquely personal or security relevant information to provide security tool 180 more information during authentication operations. The information within user defined Q&A column 752 in verification row 761 is intentionally left blank, but is fillable by the user at his or her option.

Still referring to FIG. 7, verification row 762 includes information that describes another authentication ID and corresponding transaction and verification. Verification row 762 includes twelve (12) verification attribute entries in the respective twelve (12) columns thereof. More specifically, verification row 762 stores an authentication ID "R567" in authentication ID column 741 and a default security level "3" in default security level column 742. Verification row 761 stores a personal ID "5678" in personal ID column 743, a name "BBBB" in name column 744, and an organization "DEVELOPMENT" in organization column 745. The remaining columns of verification row 762 are intentionally left blank and are fillable by the user. In a manner similar to that of verification row 762, verification rows 763 and 764 likewise populate with verification layer information as shown.

As described in detail above, each row of verification layer information 705 corresponds to a particular transaction verification, i.e. authentication, that includes authentication information, initiating personal user information, and other verification information. Security tool 180 may use the information within verification layer information store 700 to determine the relationship between the authentication ID, the initiating user as well as other attributes of the authentication corresponding to the initiating user to interacting user transaction. As shown in the information of authentication key 420, each transaction includes corresponding verification information. Security tool 180 may employ verification information as shown in authentication key 420 to assist in determining security attribute information for each particular transaction.

FIG. 8A is a diagram showing more detail of analysis layer information store 800 of FIG. 3 above. Analysis layer information store 800 includes analysis layer information 805 that describes analysis attributes of the particular transactions of network system 200. Security tool 180 may employ the analysis layer information 805 during analysis or determination of authentication levels and other authentication requirements for initiating user to interacting user transactions. Analysis layer information store 800 also includes information that resides in other stores of security information store 300, such as authentication key 420 and initiating user personal ID key 410 information. Security tool 180 may employ this pointer information as a map to authentication information within other stores of security information store 300 during authentication operations.

These attributes may be referred to as "analysis attributes". Analysis layer information 805 includes analysis information that security tool 180 may employ during implementation of the disclosed transaction security method. For example, security tool 180 may employ the information within analysis layer information 805 to determine the authenticity of the initiating user of an initiating user to interacting user transaction. In the embodiment of FIG. 8A, analysis layer information store 800 arranges analysis layer information 805 in cells that form a matrix of rows 861, 862, 863, 864 and columns 841, 842, 843 . . . 853. Each row 861, 862, 863, 864 corresponds to a different transaction analysis of the authenticity of an initiating user of an initiating user to interacting user transaction. An "initiating user" as described above may initiate a transaction by employing an "application" such as application 190 that corresponds to a particular "authentication" and corresponding "analysis". Each column 841, 842, 843 . . . 853 corresponds to a different analysis attribute. Rows 861, 862, 863, 864 may be referred to as "analysis rows" and columns 841, 842, 843 . . . 853 may be referred to as "analysis attribute columns". Other embodiments may include a larger or smaller number of analysis rows and attribute columns depending on the number of analyses and the number of analysis attributes that analysis layer information 805 employs for a particular transaction.

For an authentication that associates with a particular row of analysis layer information store 800, there are corresponding column entries of analysis attribute information in attribute columns 841, 842, . . . 853. For example, analysis row 861 includes thirteen (13) analysis attribute entries in the respective thirteen (13) columns thereof. More specifically, analysis row 861 stores an authentication ID "A234" in authentication ID column 841 and a default security level "1" in default security level column 842. These 2 attribute columns, namely authentication ID and default security level, together form an authentication key 420 that is unique to the particular transaction analysis to which row 861 corresponds. In one embodiment, authentication key 420 is identical to the authentication key 420 within personal profile information store 400, application profile information store 500, authentication layer information store 600 and verification layer information store 700. As described above, authentication key 420 provides security tool 180 with a mapping between the different stores within security information store 300. This mapping provides authentication information that corresponds to a particular initiating user to interacting user transaction.

Analysis row 861 stores a personal ID "4567" in personal ID column 843, a name "AAAA" in name column 844 and an organization "SUPPLY CHAIN" in organization column 845. These 3 analysis attribute columns, namely personal ID, name, and organization form an initiating user personal ID key 410 that is unique to the particular transaction analysis to which row 861 corresponds. In one embodiment, initiating user personal ID key 410 is identical to the initiating user personal ID key 410 within personal profile information store 400, application profile information store 500 and verification layer information store 700. During initiating user to interacting user transactions, security tool 180 may store analysis attribute information as part of analysis layer information 805 that corresponds to the particular initiating user, such as initiating user name 844 of "AAAA" as shown in row 861. That analysis attribute information as described in more detail below may correspond to unique attributes of the particular initiating user. In one embodiment, that analysis attribute information for the particular initiating user may correspond to the relationship of the initiating user to the interacting user, the particular transaction, or other factors. Security tool 180 may populate the analysis attribute information of analysis layer information 805 during previous initiating user transactions or during current user transaction analysis and authentication operations as part of the disclosed transaction security method.

Analysis row 861 stores a match analysis "25 OUT OF 50" in the match analysis column 846. For example, during user authentication operations, security tool 180 may store match analysis information that corresponds to a particular user. Security tool 180 may store previous transaction information for that particular user, such as 50 common words the user uses during communication with an interacting user. Security tool 180 may store the common words history in a database not shown. During an authentication operation, such as during an initiating user to interacting user transaction, security tool 180 may determine that the particular user uses 25 out of those 50 common words. In this manner, security tool 180 may employ that match analysis 846 information as input into a confidence or observed confidence level for authenticating the initiating user as described below.

Analysis row 861 stores an observed confidence level "50" in the observed confidence level column 847 and a confidence threshold "75" in the confidence threshold column 848. Security tool 180 may determine the observed confidence level from analysis attribute information for a particular user during authentication operations and store that observed confidence level 847 during user transactions. Security tool 180 may store confidence threshold 848 information prior to an initiating user to interacting user transaction. In one embodiment, security tool 180 may modify the confidence threshold 848 information during initiating user to interacting user transactions in response to a change in user communication characteristics, such as user text or voice changes. Other characteristics changes may include user to user interaction behavior or change in environmental factors, such as video, audio, physical location, or other environmental changes. Security tool 180 may employ the confidence threshold 848 information to determine if a particular user achieves or fails to achieve a particular confidence level that refers to the authenticity of that particular user.

Analysis row 861 stores a new words "BUDDY" in the new words column 849 and a sentence structure "REFER TO FIG. 8B" in the sentence structure column 850. In this example, the information within sentence structure column 850 and analysis row 861 is described in more detail in FIG. 8B. Security tool 180 may store a particular user's word use during previous transactions in a database not shown. In this manner, security tool 180 may determine new words that the particular user employs during initiating user to interacting user transactions, such as instant messaging transactions. During user authentication operations, security tool 180 may employ new words 849 information to determine the authenticity or observed confidence level of the authenticity for the particular user.

Analysis row 861 stores a click behavior "INFORMATION ACCESS ORDER" in the click behavior column 851. Security tool 180 may generate click behavior 851 information during user authentication operations and store that information within analysis layer information store 800. During initiating user to interacting user operations, security tool 180 may identify patterns of user click behavior, such as mouse click and movement behavior on a particular application screen, keyboard click behavior such as arrow use on a particular application screen, and other user pointing and screen positioning devices. Security tool 180 may store that click behavior as part of learned behavior key 810 information for a particular user. For example, the user may access a bank website regularly and visit three locations on the bank website screen in a consistent pattern. This pattern, namely "INFORMATION ACCESS ORDER" as shown in the click behavior column 851 may provide security tool 180 with input into the observed confidence level generation, i.e. the authenticity measure of the user, during user authentication operations. In other words, by monitoring changes in click behavior, security tool 180 may identify a user's change from previous learned behavior. Security tool 180 may determine that the change from previous learned behavior is significant enough to identify as a breach in confidence with respect to the authentication of the current user. In one embodiment, this breach in confidence causes security tool 180 to perform authentication operations for the current user at a different and more robust authentication level.

Analysis row 861 stores a keystroke behavior "25 WPM" in the keystroke behavior column 852. Security tool 180 may generate keystroke behavior 852 information during user authentication operations and store that information within analysis layer information store 800. During initiating user to interacting user operations, security tool 180 may identify keystroke patterns, frequencies, or other keystroke behavior during user transactions and store that information as part of learned behavior key 810. For example, security tool 180 may identify a particular user's keystroke speed as a 25 words per minute (WPM) typing speed. This keystroke behavior, as shown in the keystroke behavior column 852 may provide security tool 180 with input into the observed confidence level generation and authenticity measure of the user during user authentication operations. In other words, by monitoring changes in keystroke behavior, security tool 180 may identify a user's change from previously learned behavior. Security tool 180 may store average time between keystrokes (not shown), average keystroke frequency (not shown) or other keystroke behavior information within keystroke behavior 852.

By continuously monitoring the keyboard keystroke behavior of the user and storing data representative of the keyboard keystroke behavior, security tool 180 effectively learns keyboard keystroke characteristics that associate with a particular user. Security tool 180 may store that learned information within learned behavior key 810. Security tool 180 may determine that the change from previous learned behavior is significant enough indicate a breach in confidence with respect to the authentication of the current user. In one embodiment, this breach in confidence triggers security tool 180 to perform authentication operations for the current user at a different and more robust authentication level than an immediately prior authentication level of the current user. Other types of keystroke behavior may include the wait time between particular or composite keys, such as letters and numbers. Keystroke behavior may include word typing speeds for particular heavy word use, or other keystroke patterns and user typing keystroke behaviors.

Analysis row 861 stores biometric changes, i.e. "FACIAL RECOGNITION CHANGES", in the biometric changes column 853. Security tool 180 may generate and store user biometric changes 853 information during user transactions, such as initiating user to interacting user transactions. For example, security tool 180 may perform passive facial recognition operations for a particular user and store that information over time within learned behavior key 810 information. During user authentication operations, security tool 180 may perform a current facial recognition operation and compare the level of change from previous facial recognition operations that store within learned behavior key 810 information. In this manner, security tool 180 may employ that facial recognition comparison as input into a confidence or observed confidence level for authenticating the initiating user. The final 5 analysis attribute columns, namely new words 849, sentence structure 850, click behavior 851, keystroke behavior 852, and biometric changes 853 together form a learned behavior key 810 that is unique to the particular transaction analysis to which row 861 corresponds. These 5 representative attributes are user attributes that security tool 180 may store as learned user attribute history in security information store 300.

Continuing with analysis row and attribute columns, analysis row 862 includes information that describes another authentication and corresponding transaction and analysis. Analysis row 862 includes thirteen (13) analysis attribute entries in the respective thirteen (13) columns thereof. More specifically, analysis row 862 stores an authentication ID "R567" in authentication ID column 841, and a default security level "3" in default security level column 842. Analysis row 862 stores a personal ID "5678" in personal ID column 843, a name "BBBB" in name column 844, and an organization "DEVELOPMENT" in organization column 845. The remaining columns of analysis row 862 are intentionally left blank. In a manner similar to that of analysis row 861, analysis rows 862, 863 and 864 likewise populate with analysis layer information as shown.

In one example, as shown from left to right, columns 841, 842 . . . 853 of analysis row 861 include information that corresponds to a transaction wherein the authentication ID is "A234" with a default security level of "1". The personal ID of the initiating user for the transaction is "4567" and the name of the initiating user is "AAAA" within organization "SUPPLY CHAIN". For this transaction, analysis layer information 805 includes a match analysis value of "25 OUT OF 50". For example, security tool 180 may detect that the particular user employs 25 common words out of 50 common words that a particular user normally employs in a transaction. In other words, security tool 180 may determine that a particular transaction including a history of 50 unique match attributes exhibits 25 of those 50 attributes. In other examples, a match attribute may be a particular mouse or keyboard click behavior, word use, sentence structure or other learned behavior that learned "behavior key 810 stores. Security tool 180 may generate an observed confidence level of "50" for the user corresponding to the transaction shown in row 861, namely user name "AAAA". In one embodiment, the 25 out of 50 match analysis information in column 846 yields a 50%, i.e. 50 out of 100, measure that analysis layer information 805 stores as an observed confidence level of 50. Security tool 180 may employ a confidence threshold of "75" for this particular transaction, that provides a threshold or trigger to measure against observed confidence level information and to determine responsive security tool 180 actions, as described in more detail below.

The transaction exhibits a new words entry "BUDDY" for new words column 849. In this scenario, security tool 180 identifies "BUDDY" as a new word that a particular user first employs during the transaction, such as an instant messaging transaction. Security tool 180 may employ new words column 849 information to store words commonly misspelled by the user, slang words commonly used by the user, and/or other word information that pertains to the user or the particular transaction. The transaction exhibits a sentence structure described in FIG. 8B and discussed in more detail below. Referring still now to FIG. 8A, the transaction exhibits a click behavior of "INFORMATION ACCESS ORDER". In this case, analysis information store 800 stores an entry "INFORMATION ACCESS ORDER" that may describe the particular screen information access order that a user employs during access of online information during transaction operations. The transaction exhibits a keystroke behavior of "25 WPM" that identifies a user keystroke typing speed. The transaction also exhibits a biometric changes value "FACIAL RECOGNITION CHANGES". In this case, analysis information store 800 stores an entry "FACIAL RECOGNITION CHANGES" in biometrics column 852. Security tool 180 may periodically and/or aperiodically review user facial parameters and detect changes to the user facial biometric over time. For example, security tool 180 may store facial pattern recognition parameters to match previous and current user facial features.

As described in detail above, each row of analysis layer information 805 corresponds to a particular transaction analysis that security tool 180 performs. The particular transaction analysis includes authentication information, initiating personal user information and other analysis information. Security tool 180 may use the information within analysis layer information store 800 to determine the relationship between the authentication, the initiating user and other attributes of the analysis corresponding to the initiating user to interacting user transaction. As shown in the information of authentication key 420, each transaction in the respective rows of FIG. 8A includes corresponding analysis information. Security tool 180 may employ analysis information as shown in authentication key 420 to assist in determining security attribute information, such as default security levels for each particular transaction.

FIG. 8B is a diagram showing more detail of sentence structure information 850 of FIG. 8A above. Sentence structure information 850 is one example of information that analysis layer information store 800 may store within sentence structure column 850 in analysis row 861 through analysis row 864, as shown in FIG. 8A above. Security tool 180 may employ the sentence structure information during implementation of the disclosed transaction security method. In the embodiment of FIG. 8B, sentence structure information 850 includes six (6) columns of sentence structure information and corresponding row 891 example information. Row 891 information may correspond to a particular user and particular transaction for that particular user. An "initiating user", as described above may initiate a transaction by employing an "application", such as application 190 that corresponds to a particular "authentication", such as authentication ID A234 within authentication key 420. In one embodiment, sentence structure information 850 corresponds to the "initiating user" of an initiating user to interacting user transaction. In another embodiment, sentence structure information 850 corresponds to the "interacting user" of an initiating user to interacting user transaction. Other embodiments may include a larger or smaller number of sentence structure information 850 rows and columns.

Sentence structure row 891 stores common words such as "OKAY, YOU BET" in sentence structure column 881, a salutation "SIR" in salutations column 882, a verb "STRONG, PERSISTENT, TOUGH" in verbs column 883 and a noun "MACHINE, CABLE" in nouns column 884. Sentence structure row 891 stores an expression "GOOD TO HEAR FROM YOU AGAIN" in the expressions column 885 and an acronym "ASAP" in the acronyms column 886. While for discussion purposes the representative sentence structure entries in each of the columns of sentence structure information 850 discussed above involve a relatively low number of words, in actual practice each of these columns may include a significantly larger number of words than shown in FIG. 8B.

In the illustrated example of FIG. 8B, as shown from left to right, columns 881, 882 . . . 886 of sentence structure row 891 include information that corresponds to a user transaction wherein security tool 180 stores sentence structure information for the user within learned behavior key 810, as shown in FIG. 8A above. For example, the user may have employed common words during past communications. Security tool 180 may store that learned common word information and retrieve it during current or future communications to assist in the determination of the validity or authenticity of the user. In a similar manner, security tool 180 may employ all the information for a particular user, such as salutation, verbs, nouns, expressions, acronyms and other sentence structure information to determine the authenticity of the user during communications or other transactions. Security tool 180 may use the information of sentence structure information 850 in the initial authentication of the user when the user first logs on to the user's IHS, and/or for continuous authentication after the initial log on.

Figure 9A:
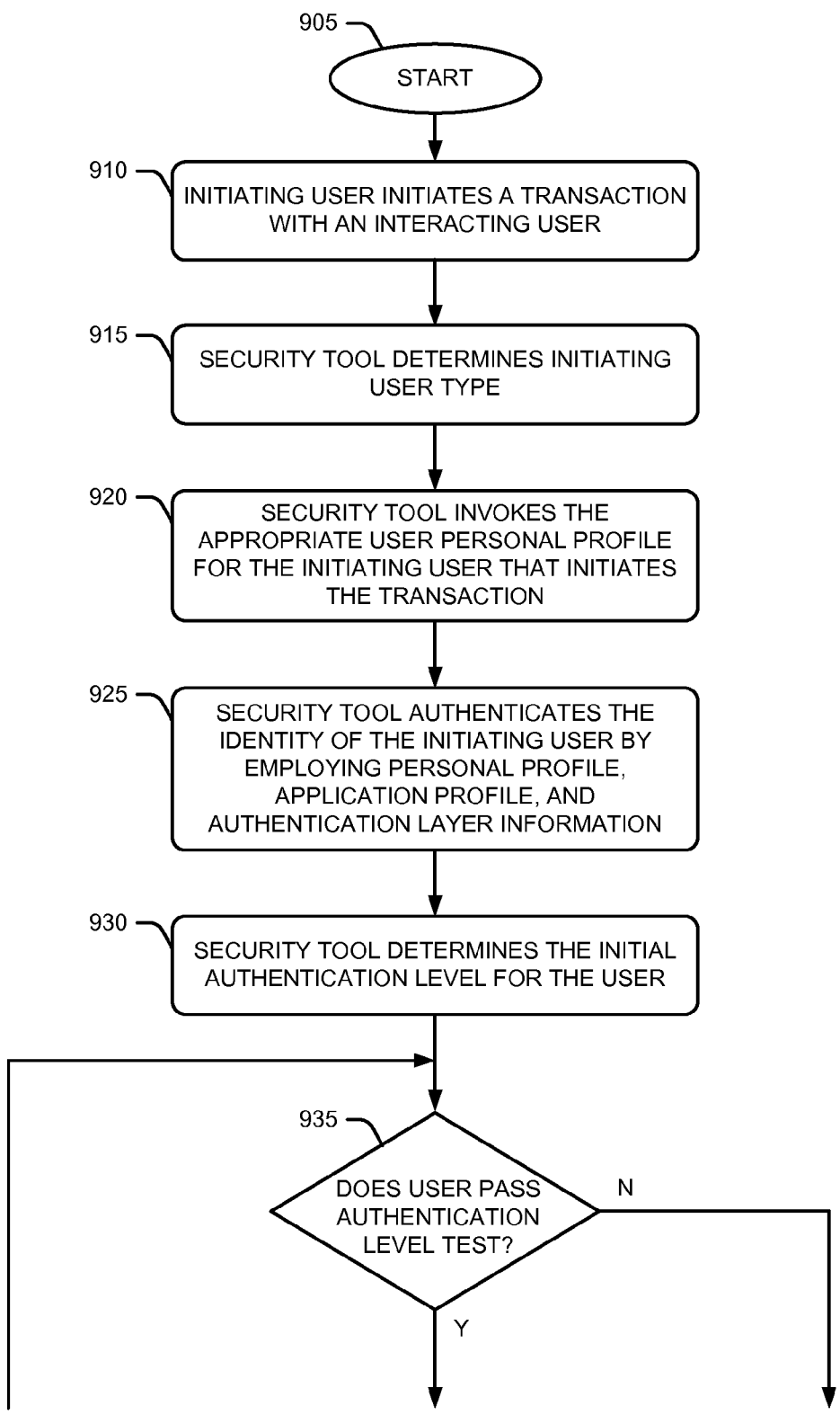
FIG. 9A and FIG. 9B depict a flowchart of an embodiment of the disclosed transaction security method that provides transaction security.
Figure 9B:
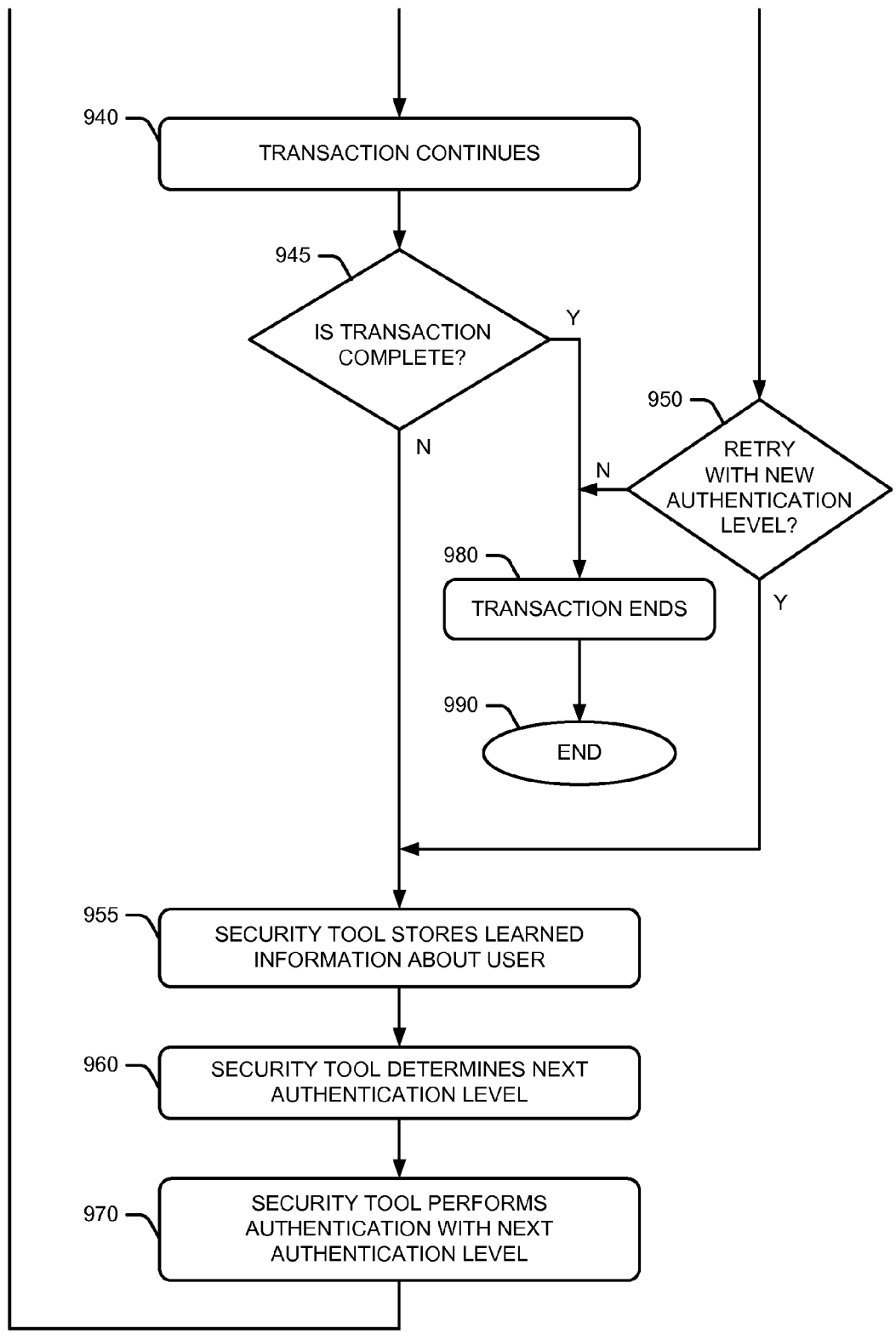

FIG. 9A and FIG. 9B together form a flowchart that shows process flow in an embodiment of the disclosed transaction security methodology that provides user authentication in association with a particular transaction. In more detail, the flowchart of FIG. 9A and FIG. 9B shows how security tool 180 that IHS 220 and IHS 280 employ provides continuous authentication, i.e. verification, of network system 200 users. Moreover, the disclosed user authentication methodology authenticates users for particular transactions by employing dynamic and multi-layered security measures. The disclosed security measures are multi-layered in the sense that they employ information from multiple layers or sources within security information store 300, such as in the determination of authentication levels during initiating user to interacting user transactions. The disclosed security measures are dynamic in the sense that they provide continuous user authentication in real time when initiating user to interacting user transactions and subsequent to an initial authentication.

The disclosed transaction security method starts, as per block 905. An initiating user initiates a transaction with an interacting user, as per block 910. For example, an initiating user, such as user 210 may initiate a text communication or other transaction with an interacting user, such as user 280. User 210 is the initiating user and user 280 is the interacting user for this communication transaction. In other embodiments, user 280 may take on the role of the initiating user and user 210 may take on the role of the interacting user. As described above, the term "user" may apply to a human user and/or other entity. For example, the initiating user may be an employee of a corporation that initiates an Internet dialog with the interacting user that is another employee of the same corporation. In another example, the initiating user may take the form of a customer who initiates a telephone number database lookup application across a network to a remote IHS location. In this example, the telephone number database lookup application assumes the form of the interacting user.

Security tool 180 determines the initiating user type, as per block 915. In this manner, security tool 180 identifies the type of initiating user, such as human, application, or other user type. Personal profile information 405 may include user type (not shown) to differentiate between initiating user type, such as human, application, or other user type. In one embodiment, the user may be an authentication application, or other application within IHS resources of network system 200. Security tool 180 invokes, i.e. accesses, the appropriate user personal profile for the particular initiating user that initiates the transaction, as per block 920. For example, if user 210 is the initiating user, security tool 180 may identify user 210 as a particular user with an initiating user personal ID key 410 entry within personal profile information store 400. In this example, security tool 180 may identify initiating user 210 as personal ID "4567" as shown in FIG. 4 user row 461 and personal ID column 451. To identify and authenticate the initiating user 210, security tool 180 may invoke or otherwise check the user profile information, namely the information within user row 461 for the initiating user 210.

Each row within personal profile information 405 corresponds to an initiating user and an interacting user as well as transaction authentication information for the initiating user and interacting user. In other words, each row within personal profile information 405 corresponds to a particular user-to-user transaction within network system 200. For one example, as shown in user row 461, the initiating user personal ID is "4567" as shown in personal ID column 451, and the interacting user is "3234" as shown in interacting user column 454. The relationship ID is "R567" that identifies a unique relationship between the initiating user and the interacting user for this particular transaction, as shown in user row 461 and relationship ID column 455. The relationship name between the initiating user and the interacting user is "CO-WORKER", as shown in user row 461 and relationship name column 456. The communication nature between the initiating user and the interacting user is "INFORMAL", as shown in user row 461 and communication nature column 457. User row 461 also identifies authentication key 420 information in authentication ID column 458 and default security level column 459.

Security tool 180 may use the information of authentication key 420 to determine more information about the user-to-user transaction. For example, security tool 180 may employ the information within application profile information 505 to identify application information that applies to the user-to-user transaction. Application profile information 505 identifies the user-to-user transaction as an instant messaging application, as shown in application row 561 and application name column 551. Application profile information store 500 may provide other information that security tool 180 employs as input into the authentication process for each user and transaction within network system 200.

Security tool 180 authenticates the identity of the initiating user by employing personal profile, application profile, and authentication layer information, as per block 925. Security tool 180 may employ the personal profile, application profile, and authentication layer information from the information within personal profile information store 400, application profile information store 500, and authentication layer information store 600, respectively. By employing the information within these stores, security tool 180 may authenticate the identity of the initiating user by requiring security responses or other feedback from the initiating user.

For example, security tool 180 may perform a passive authentication mode operation such as a passive facial recognition security test. This first authentication may employ an initial authentication level during initiating user login. Subsequent authentications may require higher authentication levels and increasingly higher and/or more robust testing criteria for the user. For example, a next authentication test may require the user to respond to questions about the organizational relationship between the initiating user and interacting user of a communication, thus providing a different authentication level. This next authentication may be an active authentication mode operation that requires active participation by the user. In another example, security tool 180 may perform an active authentication mode operation, such as a user retinal scan security test. The next authentication may change from active to passive or remain in active authentication mode. For example, a next authentication may require facial recognition or perform keyboard keystroke behavior analysis. In this manner, security tool 180 may provide different authorization levels, i.e. different testing criteria with different authentication robustness, at different times.

Security tool 180 may tailor initiating user questions or authentication techniques to the particular application, or to the relationship of the initiating user to that of the interacting user, thus providing different authentication levels.

In one example, security tool 180 modifies the authentication operations, i.e. verification operations that determine the authenticity of the user, to include input from personal relationship information between the initiating user and the interacting user. More specifically, security tool 180 may employ the information within personal profile information store 400 and/or other information within security information store 300 to determine appropriate authentication levels or other security features. In other words, security tool 180 may modify the authentication level by analyzing relationships between the initiating user and interacting user in reference to the particular user-to-user transaction. Security tool 180 may employ the information within application profile information store 500 to determine privileges and other security information that pertains to the particular user-to-user transaction. In a similar manner, security tool 180 may employ the information within authentication layer information store 600 to determine authentication methods and other authentication features that pertain to the particular user-to-user transaction.

The actions described in blocks 905 through block 925 provide for identification and authentication of the initiating user. However, in one embodiment those same actions may apply to the identification and authentication of the interacting user as well as to the initiating user. For example, if the initiating user is user 210, then security tool 180 within IHS 220 may perform the actions shown by blocks 905 through block 925. However, if the interacting user is user 280, then security tool 180 within IHS 270 may perform similar identification and authentication actions as shown by block 905 through 925 for the interacting user, namely user 280. In one example, initiating user 210 may initiate a transaction with interacting user 280, but interacting user 280 should also login or identify and authenticate in order for the transaction to progress. In other words, each step or block within FIG. 9A and FIG. 9B applies to both the initiating user and the interacting user during user-to-user transactions in this particular embodiment.

Continuing with the description of FIG. 9A and FIG. 9B, the term "user" may apply to both the initiating user and the corresponding interacting user. In one embodiment, a user-to-user transaction may involve more than two users. For example, three or more users may join in a text communication joint conference or other communication transaction. Each step within FIG. 9A and FIG. 9B applies to each of the more than two users in a transaction for which security tool 180 provides security.

Security tool 180 determines the initial authentication level for the user, as per block 930. For example, security tool 180 may determine from the information in security information store 300 that the user may authenticate with an initial authentication level that requires only password control. In another example, if the transaction involves higher risk and/or more sensitive information, security tool 180 may require a higher initial authentication level, such as biometric fingerprint analysis or other operation.

Security tool 180 performs a test to determine if the user passes the authentication level test, as per block 935. If the user passes the current authentication level test, then the transaction continues, as per block 940. Security tool 180 performs a test to determine if the transaction is complete, as per block 945. If the user does not pass the authentication level test of block 935, then security tool 180 performs a test to determine if it should retry the authentication level test with a new authentication level, as per block 950. Security tool 180 may determine when to "RETRY" and when not to "RETRY" with a new authentication by evaluating multiple security factors. Those security factors may include detection of changes in environmental factors, such as location changes, and other environmental factors. Those security factors may also include a user passive authentication trigger, such as a user forcing a new authentication test in response to transaction security concerns. During transactions operations, security tool 180 may analyze security factors dynamically "in real time" to determine when to, and when not, retry authentication with a new authentication level.

If the security tool 180 determines to retry the authentication level test with a new authentication level, or if the transaction is not complete, then security tool 180 may store learned information about the user, as per block 955. For example, as shown in learned behavior key 810 of analysis layer information store 800, security tool 180 may store a learned user attribute history of particular user information. Security tool 180 may store sentence structure, mouse and keyboard click behavior, or other learned behavior as unique historical or knowledge-based information about the particular user. This learning feature allows security tool 180 to perform periodic and/or aperiodic updates to the information within learned behavior key 810 and keep track of changes that the tool may employ to perform user authentication and security checks in the future. In this manner, security tool 180 may dynamically alter user authentication test criteria over time to coincide with gradual changes in the user's behavior.

For example, security tool 180 may store a user's keystroke behavior over time, such as words per minute (WPM) typing speed within keystroke behavior 851. Security tool 180 may monitor the user's keystroke behavior in subsequent transactions and if that behavior, such as WPM typing speed, changes slowly over time, security tool 180 may determine that as a reasonable amount of change insufficient to indicate a breach of confidence in the authentication of the user. In this manner, a user may change keystroke behavior over time without triggering a false security breach detection by security tool 180. However, if security tool 180 detects a sudden abrupt change in keystroke behavior such as a significant, i.e. substantial, change in WPM typing speed, security tool 180 may perform a new and more robust authentication of the user in response to an observed substantial decrease in confidence level with respect to the authenticity of the user.

Security tool 180 determines the next authentication level, as per block 960. For example, security tool 180 may determine to increase, decrease, or keep same the authentication level as the current authentication level. In this manner, security tool 180 may generate multiple authentication levels, such as dynamically changing authentication levels during transaction operations. Security tool 180 may dynamically adjust the authentication levels by taking into account current user interactions, application status, as well as other transaction information. In block 960, security tool 180 may change the next authentication level in response to a preset authentication layer. A preset authentication layer combines both active and passive authentication factors that correspond to a particular user or a particular combination of interacting users.

Security tool 180 performs authentication with the next authentication level now as the current authentication level, as per block 970. In other words, security tool 180 performs authentication of the initiating user and any interacting users for this transaction in real time during transaction operations. Security tool 180 may employ the information within verification layer information 705 to determine questions and answers for a particular user during authentication, such as question and answer interrogation. Security tool 180 continues testing users to determine if the user passes testing according to the current authentication level again as per block 935. If the transaction is complete, as per block 945, or if the user fails the authentication level test, as per block 950, the transaction ends, as per block 980. The disclosed transaction security method ends, as per block 990. The security tool 180 may perform the above steps for any user of network system 200 prior to and during any transaction.

Figure 10A:
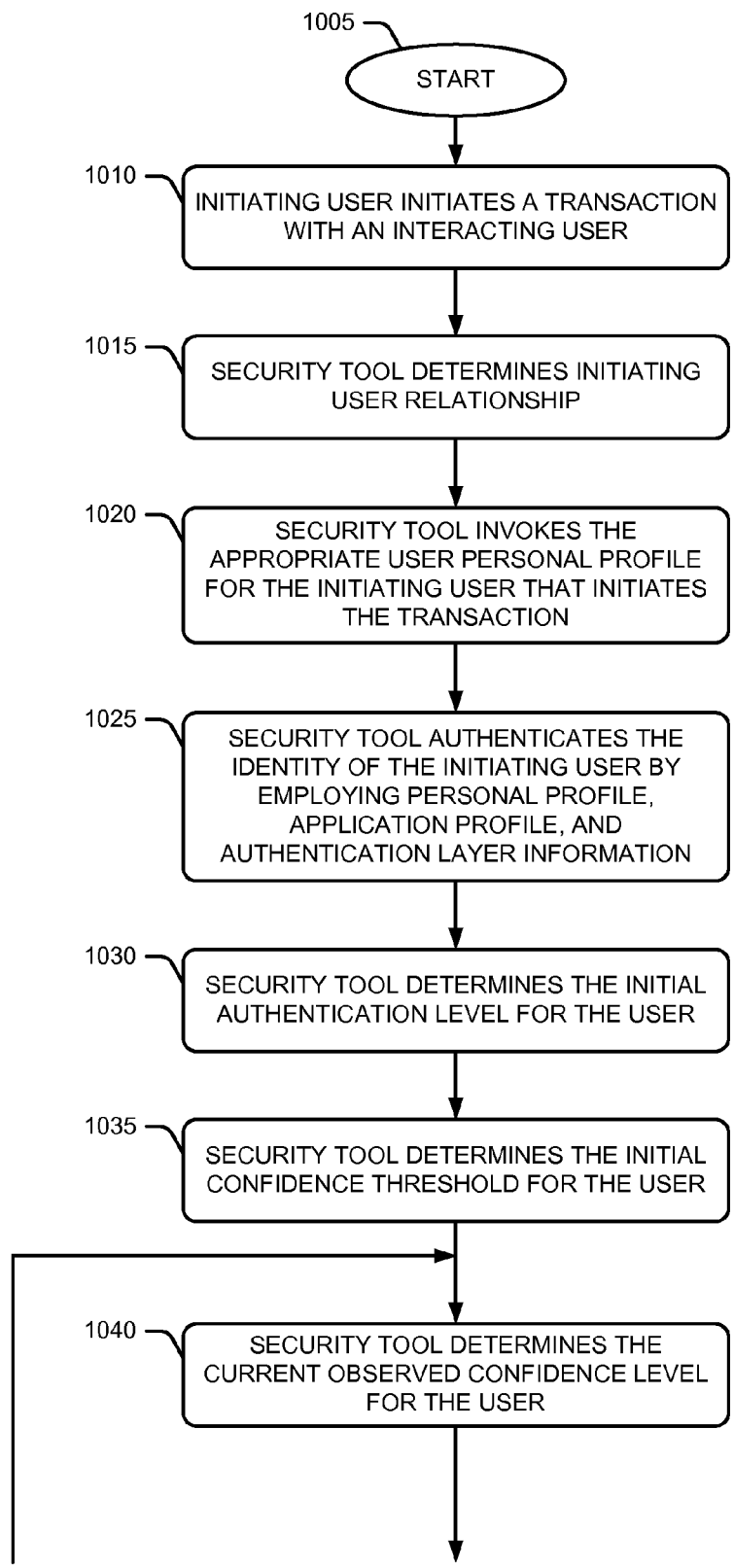
FIG. 10A and FIG. 10B depict a flowchart of an embodiment of the disclosed transaction security method that provides user relationship transaction security.
Figure 10B:
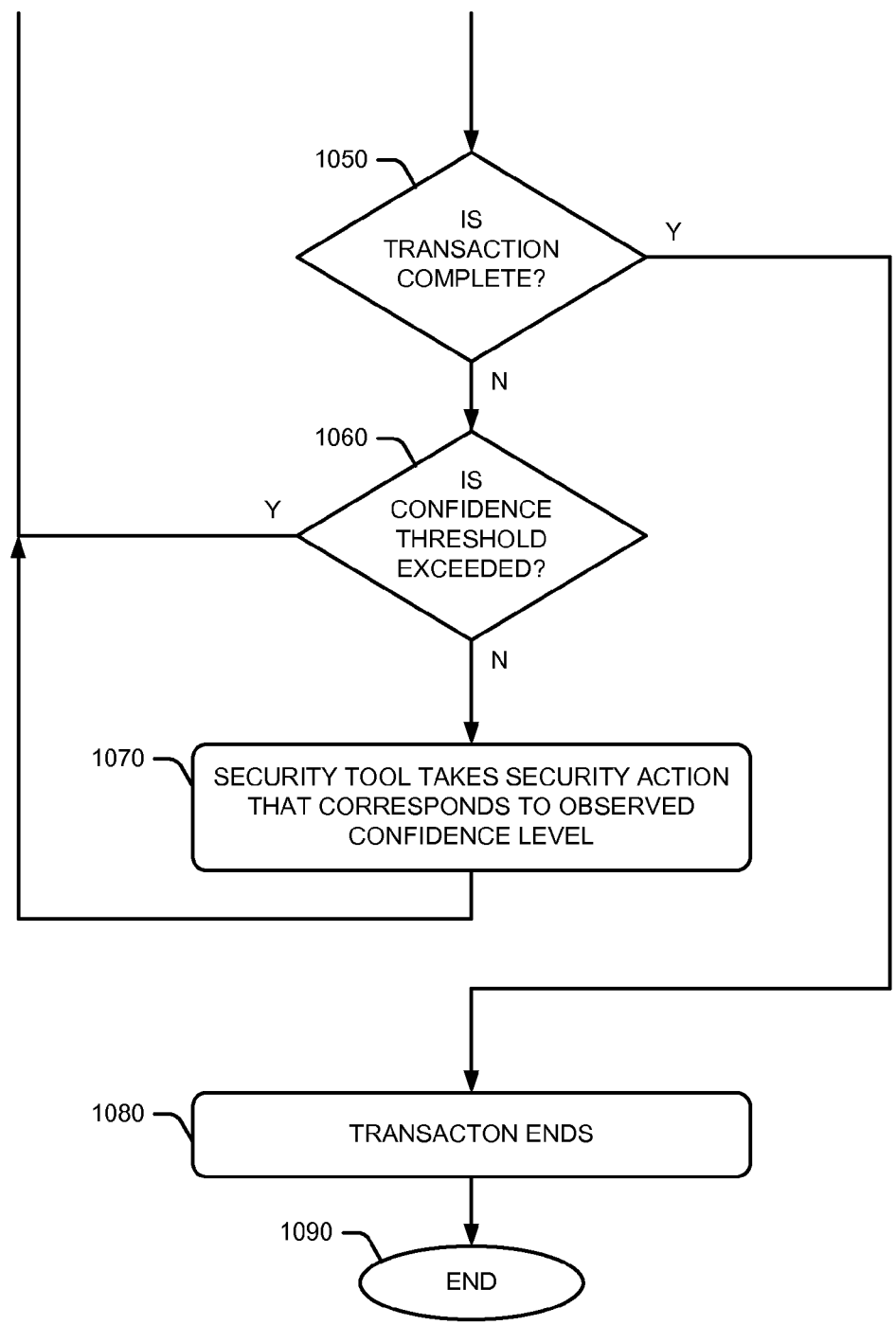

FIG. 10A and FIG. 10B is a flowchart that shows process flow in an embodiment of the disclosed transaction security methodology that includes user observed confidence level determination. The observed confidence level is a measure of security tool 180 that describes the amount of confidence that a particular user's current authenticated identity is valid. In more detail, the flowchart of FIG. 10A and FIG. 10B shows how security tool 180, that IHS 220 and IHS 280 employ, provides continuous observed confidence level monitoring and confidence threshold verification for network system 200 users and user transactions by employing dynamic and multi-layered security measures.

The disclosed transaction security method starts, as per block 1005. An initiating user initiates a transaction with an interacting user, as per block 1010. For example, an initiating user such as user 210 may initiate a text communication or other communication transaction with an interacting user such as user 280. User 210 is the initiating user and user 280 is the interacting user for this communication transaction. In other embodiments, user 280 may take on the role of the initiating user and user 210 may take on the role of the interacting user. As described above, the term "user" may apply to a human user or other entity such as an IHS. For example, the initiating user may be an employee of a corporation that initiates an Internet dialog with the interacting user that is another employee of the same corporation. In another example, the initiating user may take the form of a customer who initiates a telephone number database lookup application across a network to a remote IHS location. In this example, the telephone number database lookup application assumes acts as the interacting user.

Security tool 180 determines the initiating user relationship, as per block 1015. In this manner, security tool 180 identifies the relationship of the initiating user, such as human, application, or other user type to that of the interacting user. Security tool 180 may determine the initiating user relationship by employing the information within personal profile information 405. For example, as shown in FIG. 4, personal profile information 405 includes relationship ID and relationship name information for each transaction, as shown in columns 455 and 456, respectively. Security tool 180 invokes the appropriate user personal profile for the initiating user that initiates the transaction, as per block 1020. For example, if user 210 is the initiating user, security tool 180 may identify user 210 as a particular user with an initiating user personal ID key 410 entry within personal profile information store 400. In this example, security tool 180 may identify initiating user 210 as personal ID "4567" as shown in FIG. 4 in user row 461 and personal ID column 451. To identify the initiating user 210, security tool 180 may invoke or otherwise check the user profile information, namely the information within user row 461 for the initiating user 210.

Each row within personal profile information 405 corresponds to an initiating user and an interacting user as well as transaction authentication information for the initiating user and interacting user. In other words, each row within personal profile information 405 corresponds to a particular user-to-user transaction within network system 200. For one example, as shown in user row 461, the initiating user personal ID is "4567" as shown in personal ID column 451, and the interacting user is "3234" as shown in interacting user column 454. The relationship ID is "R567" that identifies a unique relationship between the initiating user and the interacting user for this particular transaction, as shown in user row 461 and relationship ID column 455. The relationship name between the initiating user and the interacting user is "CO-WORKER", as shown in user row 461 and relationship name column 456. The communication nature between the initiating user and the interacting user is "INFORMAL", as shown in user row 461 and communication nature column 457. User row 461 also identifies authentication key 420 information in authentication ID column 458 and default security level column 459.

Security tool 180 may use the information of authentication key 420 to determine more information about the user-to-user transaction. For example, security tool 180 may employ the information within application profile information 505 to identify application information that applies to the user-to-user transaction. Application profile information 505 identifies the user-to-user transaction as an instant messaging application, as shown in application row 561 and application name column 551. Application profile information store 500 may provide other information that security tool 180 employs as input into the authentication process for each user and transaction within network system 200. In a similar manner, security tool 180 may employ the information within analysis layer information 805 to identify unique learned user attribute history information, such as user behavior information for each user, as well as other information. Security tool 180 may employ the learned behavior key 810 information to determine the authenticity of each user during transaction operations.

Security tool 180 authenticates the identity of the initiating user by employing personal profile, application profile, and authentication layer information, as per block 1025. Security tool 180 may employ the personal profile, application profile, and authentication layer information from the information within personal profile information store 400, application profile information store 500, and authentication layer information store 600, respectively. By employing the information within these stores, security tool 180 may authenticate the identity of the initiating user by requiring security responses or other feedback from the initiating user during authentication.

For example, security tool 180 may perform a passive authentication mode operation such as a passive facial recognition security test. This first authentication may employ an initial authentication level during initiating user login. Subsequent authentications may require higher authentication levels and increasingly higher testing criteria for the user. For example, a next authentication test may require the user to respond to questions about the organizational relationship between the initiating user and interacting user of a communication. This next authentication may be an active authentication mode operation that requires active participation by the user. In another example, security tool 180 may perform an active authentication mode operation, such as a user retinal scan security test. The next authentication may change from active to passive or remain in active authentication mode. For example, a next authentication may require facial recognition or perform keystroke pattern recognition operations. In this manner, security tool 180 may provide different authorization levels, i.e. different testing criteria, at different times. Security tool 180 may tailor initiating user questions or authentication techniques to the particular application, or to the relationship of the initiating user to that of the interacting user, thus providing different authentication levels.

In one example, security tool 180 modifies the authentication operations, i.e. verification operations, to include input from personal relationship information that describes the relationship between the initiating user and the interacting user. Security tool 180 may employ the information within personal profile information store 400 or other information within security information store 300 to determine appropriate authentication levels or other security features. In other words, security tool 180 may modify the authentication level by analyzing relationships between the initiating user and interacting user in reference to the particular user-to-user transaction that involves these two users. Security tool 180 may employ the information within application profile information store 500 to determine privileges and other security information that pertains to the particular user-to-user transaction. In a similar manner, security tool 180 may employ the information within authentication layer information store 600 to determine authentication methods and other authentication features that pertain to the particular user-to-user transaction.

The actions, as described in blocks 1005 through block 1025 provide for identification and authentication of the initiating user. However, in one embodiment, those same actions may apply to the identification and authentication of the interacting user as well. For example, if the initiating user is user 210, then security tool 180 within IHS 220 may perform the actions shown by blocks 1005 through block 1025. However, if the interacting user is user 280, then security tool 180 within IHS 270 may perform similar identification and authentication actions as shown by block 1005 through 1025 for the interacting user, namely user 280. In one example, initiating user 210 may initiate a transaction with interacting user 280, but interacting user 280 should also login or identify and authenticate in order for the transaction to progress. In other words, each action or block within FIG. 10A and FIG. 10B applies to both the initiating user and the interacting user during user-to-user transactions.

Continuing with the description of FIG. 10A and FIG. 10B, the term "user" may apply to both initiating user and corresponding interacting user. In one embodiment, a user-to-user transaction may involve more than two users. For example, three or more users may join in a text communication joint conference or other communication transaction. Each step within FIG. 10A and FIG. 10B applies to each user of the transaction for which security tool 180 provides security.

Security tool 180 determines the initial authentication level for the user, as per block 1030. For example, security tool 180 may determine from the information in security information store 300 that the user may authenticate with an initial authentication level that requires only password control. In another example, if the transaction is a particularly sensitive transaction, security tool 180 may require a higher initial authentication level, such as biometric fingerprint analysis or other operation. Security tool 180 determines the initial confidence threshold for the user, as per block 1035. For example, security tool 180 may determine from the information in security information store 300 that the user relationship requires an predetermined initial confidence threshold of 75. In particular, security tool 180 may employ the information as shown in confidence threshold column 848 and analysis row 861 within analysis layer information 805 of FIG. 8A. Security tool 180 may employ a default confidence threshold upon initiation of an initiating user to interacting user transaction. Security tool 180 may modify the default confidence threshold from passive and active authentication information that the security tool determines from learned behavior information during the initiating user to interacting user transaction. The confidence threshold may correspond to the role of a particular user within an organization, such as manager, peer, as well as the relationship and communication style (formal or informal) between the initiating user and interacting user of the transaction. If the user changes to a new role, security tool 180 may adjust the confidence threshold to correspond to the user role information. In one embodiment, the user may set the confidence threshold level prior to, during, or after an initiating user to interacting user transaction.

Security tool 180 determines the observed confidence level for the user, as per block 1040. For example, security tool 180 may determine from the information in security information store 300 that the observed confidence level is 50. Security tool 180 may employ the information within learned behavior key 810 to determine the observed confidence level from the user input during transaction operations. In one example, security tool 180 may monitor and capture match analysis information, such as that shown in column 846 in FIG. 8A to identify how many matches exist between current user activity in comparison with the user's historical behavior, i.e. learned user attribute history information for that user. For example, security tool 180 may identify the number of times that words input by the user over a predetermined period of time and/or during a particular transaction matches common words, e.g. 25 times, out of a list, e.g. of 50 common words (not shown) that the particular user typically inputs. Observed confidence levels may change continuously during user transaction operations. The number of times the security tool 180 determines matches may determine the current observed confidence level. In one embodiment, security tool 180 may determine that a larger number of matches corresponds to a higher current observed confidence level.

Security tool 180 performs a test to determine if the transaction is complete, as per block 1050. If the transaction is not complete, then security tool 180 performs a test to determine if the predetermined confidence threshold is exceeded, as per block 1060. If the current observed confidence level does not exceed the predetermined confidence threshold, security tool 180 may determine that the user is not an authenticated user, i.e. the user is not valid. In other words, in one embodiment, unless the current observed confidence level for a particular user exceeds the predetermined confidence level, security tool 180 may flag the user as not being an authenticated user. For instance, security tool 180 may determine from a user's current actions, such as the user's language structure, i.e sentence structure, that the user exhibits substantially different current behavior in comparison with learned user attribute history information within learned behavior key 810 for that user. Security tool 180 performs background or passive tests such as monitoring sentence structure, mouse and keyboard click behavior, as well as other user tests to generate a composite observed confidence level. However, a different observed confidence level may associate with each of these passive authentication tests individually. A different observed confidence level may also associate with each of multiple active authentication tests individually. Security tool 180 may employ a different confidence threshold for each of these tests whether the test is passive or active. In other words, security tool 180 employs different respective predetermined confidence thresholds for different types of authentication tests such as a passive sentence structure test, a passive mouse behavior test, a passive keyboard click behavior test, a passive keyboard fingerprint test, an active fingerprint scan test, and an active retinal scan test, for example. Each of these passive and active authentication tests exhibits a different observed confidence with respect to a particular user. It is noted that each of these passive and active authentication tests correspond to different authentication levels.

As discussed above, security tool 180 may employ a different predetermined confidence threshold for each of these different authentication tests. Security tool 180 may determine this confidence threshold level according to the unique relationship of the initiating user to the interacting user. For example, a peer-to-peer relationship transaction may be less of a security risk than a peer-to-boss relationship transaction. In that case, the peer-to-peer relationship transaction may employ a lower confidence threshold number than the peer-to-boss relationship transaction. In this manner, a peer-to-peer relationship transaction may stay above the confidence threshold number with greater ease than a peer-to-boss relationship transaction. For example, security tool 180 may employ a confidence threshold number of 50 for a peer-to-peer relationship transaction, whereas security tool 180 may employ a confidence threshold number of 75 for a peer-to-boss relationship transaction. Using these confidence threshold number examples, an observed confidence level of 60 would be acceptable during user-to user transactions but would not be acceptable for the peer-to-boss transaction. In other words, security tool 180 would indicate a breach of confidence for the peer-to-boss transaction in this case.

If the security tool 180 determines that the confidence threshold is exceeded at decision block 1050 thus authenticating the user, then the security tool determines again the observed confidence level for the user, as per block 1040, and flow continues. In this case, there is no breach of confidence and authentication testing continues. However, if the security tool 180 determines that the confidence threshold is not exceeded at decision block 1050 thus indicating that the user is not authentic, then the security tool takes a responsive security action that corresponds to the current observed confidence level, as per block 1070. In this case, there is a breach of confidence and security tool 180 takes appropriate action in response. In other words, depending upon the current observed confidence level, security tool 180 may take different actions. If the observed confidence level is high, but just under the confidence threshold, then the security tool 180 may log the information and take no action, or perform a background passive authentication. However, if the observed confidence level is low, and significantly less than the confidence threshold, then the security tool 180 may take immediate active security action, such as requiring active authentication from the user, informing the other user in the transaction that a security breach is in progress, or any other security action. In this case, security tool 180 may change the authentication level in response to the breach of confidence. With such a change in the authentication level for a particular user for which the security tool determines a breach of confidence, the security tool may increase the strength, i.e. robustness, of the authentication test that the security tool employs for that particular user.

Security tool 180 may initiate any particular authentication or security action depending upon the corresponding observed confidence level as well as other factors of the transaction. Other factors in the transaction may include the sensitivity of the information that corresponds to the transaction, the relationship of the users in the transaction, as well as other factors. Examples of passive security actions may include fingerprint identification from keyboard input, passive facial recognition identification from security cameras and click behavior analysis. Examples of active security actions may include requests for retinal scans before allowing the user to continue, and/or requesting the answer to a series of security questions. Many other passive and active security operations are possible. Each of these security actions corresponds to a different authentication level, i.e a different authentication test. After taking an appropriate security action in response to a breach of confidence such as changing the authentication level, process flow continues from block 1070 back to block 140. The security tool determines the observed confidence level for the user again, as per block 1040, and flow continues. If the transaction is complete, as per block 1050, the transaction ends, as per block 1080. The disclosed transaction security method ends, as per block 1090. The security tool 180 may perform the above actions for any user of network system 200 prior to and during any transaction.

As described above, the term "user" may include a human user or other entity such as an IHS that provides input to, or receives output from, the disclosed methodology and/or disclosed apparatus. In one embodiment, an IHS may transfer or otherwise communicate information from one initiating source to another interacting or receiving source. In one example, an email transfer takes the place of the initiating user. In other words, a particular communication, such as an email message corresponds to the initiating user. In this example, the disclosed transaction security method may perform authentication actions for the contents of the email communication similar to those discussed above. Security tool 180 may identify the relationship of the initiating user (email) to that of the interacting user (receiving user) and provide transaction authentication as well as confidence level analysis of the email contents prior to and/or during delivery. If the contents of the email message result in a low confidence level below the observed confidence threshold at block 1060, security tool 180 may take a responsive security action such as stopping the email message transfer, informing users of the potential security breach, and/or take another security action. The email message content review and corresponding observed confidence level determination may correspond to the relationships of the user parties of the communication or other factors.

In one example, security tool 180 performs analysis of email content to assure that sensitive or confidential information, such as to government-to-government controlled technology does not violate international technology exportation guidelines. In another example, security tool 180 may identify highly sensitive or confidential information within an email message and respond with a more robust examination of the email content or more robust authentication to determine if the user email recipient names are accurate. In other words, security tool 180 may assist in determining that a user is actually sending the email message to the intended proper person. that the initiating user intends for the information. For example, within an organization multiple users may have the same or similar names. Security tool 180 may determine that an email message sent to "John Smith" in New York was actually intended by the user for "John Smith" in Los Angeles by comparing the named recipient to a similarly name recipient within learned behavior key 810 information. In this manner, prior email transfer learned behavior in the learned user attribute history may direct security tool 180 to halt that email transfer until further security operations, such as passive or active authentication takes place.

Figure 11A:
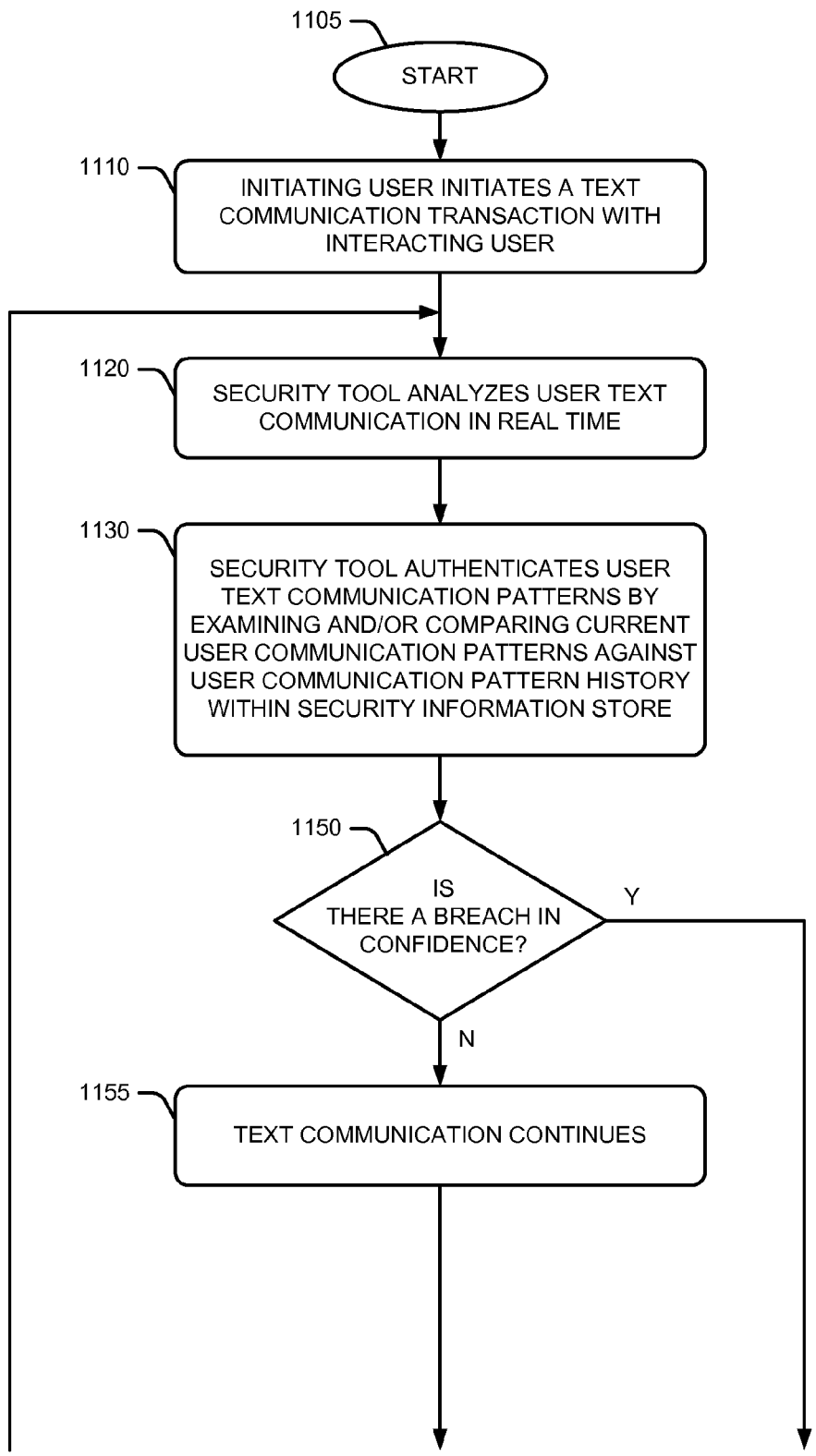
FIG. 11A and FIG. 11B depict a flowchart of another embodiment of the disclosed transaction security method that provides transaction security.
Figure 11B:
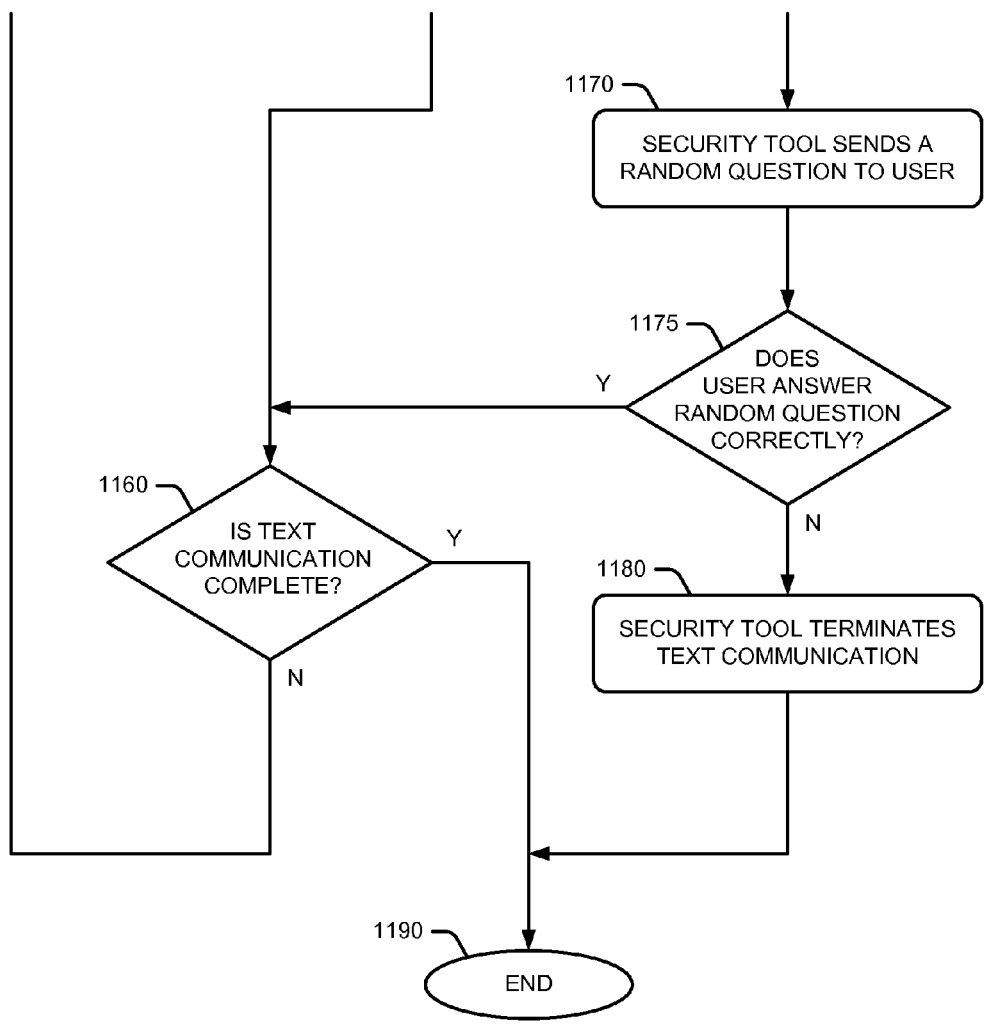

FIG. 11A and FIG. 11B is a flowchart that shows process flow in another embodiment of the disclosed transaction security methodology that provides user transaction authentication, i.e. verification. More specifically, the flowchart of FIG. 11A and FIG. 11B shows how security tool 180 provides multi-layer and continuous transaction security during text communication between two or more users. The disclosed method starts, as per block 1105. An initiating user initiates a text communication transaction with an interacting user, as per block 1110. For example, an initiating user, such as user 210 may initiate an instant messaging application transaction with interacting user 280. In the blocks of FIG. 11A and FIG. 11B, the term "user" applies to both initiating user and interacting users, such as user 210 and user 280, respectively. In another embodiment, user 280 may be the initiating user and user 210 may be the interacting user. In yet another embodiment, multiple users (not shown) may be interacting users in network system 200. For example, an initiating user such as user 210 may initiate text communications with multiple users, such as interacting user 280 and other interacting users (not shown).

Security tool 180 analyzes user text communication information in real time, as per block 1120. In other words, security tool 180 analyzes or parses the text communication for each user during the text communication transaction, such as an instant message transaction. Security tool 180 authenticates user text communication patterns by examining and/or comparing current user communication patterns against user communication pattern history within security information store 300, as per block 1130. In this manner, security tool 180 may authenticate the particular user that initiates the text communication transaction. Security tool 180 may compare current user communication patterns, such as common word use, textual relationship references, sentence structure and other user communication patterns against communication pattern history for each user in real time. More particularly, security tool 180 employs information within learned behavior key 810, such as that within analysis layer information store 800 and other information within security information store 300 to compare actual user text communication patterns with learned user text communication patterns, i.e. text communication pattern history.

Security tool 180 may employ the information within personal profile information store 400 to determine user relationships and well as other information that pertains to the user-to-user text communication transaction. In the above-described comparisons, security tool 180 may use other communication pattern information, such as the user's common words, salutation history, i.e. "Mr.", "Sir", or other salutation use, use of verbs and nouns, expressions use, as well as other communication pattern information, i.e. sentence structure information of each user.

Security tool 180 may employ the authentication layer information within authentication layer information store 600 to determine how often to authenticate each user. Security tool 180 may employ the information within analysis layer information store 800 to determine if a particular user's current text patterns, e.g. sentence structure, matches that user's learned sentence structure that analysis layer information store 800 stores for that particular user as learned user attribute history information. Security tool 180 may employ the information within personal profile information store 400 to determine a particular user's relationship to other users during text communication. Security tool 180 may employ this relationship information to determine authentication levels during authentication operations.

Security tool 180 performs a test to determine if there is a breach in confidence, as per block 1150. In other words, security tool 180 authenticates current user text communication patterns, such as sentence structure, to determine if those patterns are valid or not valid for a particular user. In that manner, security tool 180 authenticates the particular user.

For example, the text communication pattern of a typical user may exhibit a corresponding average time between keystrokes, average WPM typing speed, or other keystroke behavior. Security tool 180 may monitor the user's keystroke behavior over time and determine the user's average time between keystrokes, average WPM typing speed, and/or other keystroke behavior. Security tool 180 may store a particular user's average time between keystrokes as pattern information in learned behavior key 810, namely as learned user attribute history information in learned behavior key 810. In one example, security tool 180 tests to see if the current average time between keystrokes input by the particular user is within a predetermined margin of the particular user's average historical average time between keystrokes. This test determines if there is a breach in confidence with respect to the authentication of a particular user, as per decision block 1150. More particularly, if decision block 1150 determines that the particular user's current average time between keystrokes is within the predetermined margin of particular user's average historical average time between keystrokes, then there is no breach of confidence.

When there is no breach in confidence, text communication continues as per block 1155. In other words, when the current keystroke typing pattern of the particular user substantially matches the stored historical typing pattern of the particular user as stored in learned behavior key 810, then the current keystroke typing pattern is valid and there is no breach of confidence. Security tool 180 thus finds that the particular user is still authentic and text communication may continue. Stated still another way, in this scenario the current text communication pattern exemplified by the average time between keystrokes substantially matches the previously stored historical text communication pattern of the particular user. The current text communication pattern of the particular user is thus valid and text communication may continue.

However, if security tool 180 determines that a particular user's current keystroke typing pattern substantially diverges from the stored historical typing pattern, i.e. the learned user attribute history, of the particular user, then the current keystroke pattern is not valid. In other words, when the current keystroke typing pattern of the particular user substantially diverges from a match to the stored historical typing pattern of the particular user, then the current keystroke typing pattern is not valid and the security tool determines that there is a breach of confidence in the authenticity of the particular user. Security tool 180 thus finds that the particular user may not be authentic and in response security tool 180 may halt text communication and/or require more robust authentication operations. Security tool 180 may change the authentication level in response to the breach in confidence in the authentication of the particular user. Stated still another way, in this scenario the current text communication pattern exemplified by the average time between keystrokes substantially diverges from a match with the previously stored historical text communication pattern of the particular user. The current text communication pattern of the particular user is thus not valid and text communication may stop and/or security tool 180 may provide more robust authentication operations.

Security tool 180 performs a test to determine if the text communication is complete, as per block 1160. If the text communication is not complete then security tool 180 continues analyzing text communication information in real time again as per block 1120 and flow continues. Returning to decision block 1150, security tool 180 may determine that there is a breach in confidence and send a random question to the user, as per block 1170, to effectively change the authentication test that the security tool currently employs to authenticate the user. For example, security tool 180 may determine that a user suddenly starts misapplying a particular salutation, such as the use of "MR." instead of "SIR" inconsistent with that user's history or stored pattern of salutation use within learned behavior key 810, and more specifically within sentence structure information 850.

In this example, security tool 180 may determine that a sudden change of a user attribute such as sentence structure usage by the user indicates a breach in confidence and initiate a random question to the user as a security measure. Security tool 180 may employ verification information within verification layer information store 700 during selection of the random question. Security tool 180 may select a personal question, such as "SOCIAL SECURITY NUMBER" as shown in verification row 761 and personal question column 746. In this manner, security tool 180 requires the user to respond with the personal answer, as shown in verification row 761 and personal answer column 747 of verification layer information store 700. If the user does not respond with accurate information in a reasonable amount of time, security tool 180 may determine that there is a breach in confidence and initiate security measures, such as transaction termination, as described herein.

Security tool 180 performs a test to determine if the user answers the random question correctly, as per block 1175. If the user properly answers the random question correctly, then security tool 180 continues testing for communication completion as per block 1160 and flow continues. However, if the user does not answer the random question correctly, security tool 180 terminates the text communication, as per block 1180. If security tool 180 terminates the text communication transaction, or if the communication is complete, the disclosed transaction security method ends, as per block 1190. In other embodiments of the disclosed transaction security methodology, security tool 180 may substitute the user authentication, as shown per boxes 1170 and 1175 with other forms of authentication operations, i.e different authorization levels. For example, security tool 180 may perform active or passive authentication operations in response to a breach in confidence, as shown again per box 1150. In other examples, security tool 180 may perform biometric analysis, such as fingerprint analysis, facial recognition, or other authentication operation in response to a breach in confidence in user authenticity.

As will be appreciated by one skilled in the art, aspects of the disclosed application optimizer methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Security tool 180 may determine to terminate any text communication if one or more users of that transaction cause a breach in confidence. In this manner, security tool 180 protects the integrity of transactions, such as text communications in real time, providing continuous authentication of users and user actions.

In one embodiment, security tool 180 provides transaction security for mobile payments or other electronic transactions. For example, if an initiating user performs an electronic transaction, such as an electronic payment anywhere in the world, security tool 180 may provide transaction security, such as active or passive authentication for the transaction during transaction operations. For example, security tool 180 may determine that the initiating user is making a payment that is larger than normal transactions for that user, thus resulting in a lower observed confidence level for that transaction. Security tool 180 may respond to this lower observed confidence level by treating it as a breach of confidence. Security tool 180 may respond to the breach of confidence by changing the authentication level and issuing a different authentication test to the user and/or by halting the transaction.

Security tool 180 may determine normal or historical observed payment sizes from historical user attribute information within learned behavior key 810 of security information store 300. In a similar manner, security tool 180 may determine that the initiating user is making a payment in a location that is new to that user. Since this activity falls outside the user's normal learned behavior that learned behavior key 810 stores, security tool 180 may change the authentication level and perform a passive authentication, such as fingerprint read test, mouse and keyboard click behavior test, keyboard keystroke pattern test or other passive analysis to raise the observed confidence level of the transaction in an attempt to authenticate the user. Security tool 180 may employ active authentication security operations or take other security measure(s) if the observed confidence level does not exceed the confidence threshold level that security tool 180 determines for each transaction.

In another embodiment of the disclose security transaction method, security tool 180 may provide transaction security for electronic data interchange (EDI) operations. EDI is one communication method that provides structured electronic transmission of data between organizations. Security tool 180 may provide transaction security operations for these electronic data information exchanges, i.e. EDI transactions. Security tool 180 may determine the observed confidence level of the transaction by reviewing security sensitive information that pertains to the transaction, such as financial information, proprietary data communication, and/or other factors. Security tool 180 may perform security authentication operations to determine if the security sensitive information information is transferring between the correct and/or authenticated users.

Security tool 180 provides multi-layer security protection by increasing, decreasing, or maintaining constant the authentication level during authentication operations. In one embodiment, multiple authentication levels provide security tool 180 with this multi-layer security protection. Security tool 180 employs real time continuous and dynamic inspection of user responses, actions, and other security measures to maintain the integrity of user transactions within network system 200. In this manner, detection of breaches in security, or other triggering events may provide user transactions and user transaction information with increased protection from unauthorized access.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 9A, FIG. 9B, FIG. 10A, FIG. 10B, FIG. 11A, and FIG. 11B flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIG. 9A, FIG. 9B, FIG. 10A, FIG. 10B, FIG. 11A, and FIG. 11B and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIG. 9A, FIG. 9B, FIG. 10A, FIG. 10B, FIG. 11A, and FIG. 11B described above.

The flowcharts of FIG. 9A, FIG. 9B, FIG. 10A, FIG. 10B, FIG. 11A, and FIG. 11B illustrate the architecture, functionality, and operation of possible implementations of systems, methods and computer program products that perform network analysis in accordance with various embodiments of the present invention. In this regard, each block in the flowcharts of FIG. 9A, FIG. 9B, FIG. 10A, FIG. 10B, FIG. 11A, and FIG. 11B may represent a module, segment, or portion of code, which comprises one or more executable instructions for implementing the specified logical function(s). It should also be noted that, in some alternative implementations, the functions noted in the block may occur out of the order noted in FIG. 9A, FIG. 9B, FIG. 10A, FIG. 10B, FIG. 11A, and FIG. 11B. For example, two blocks shown in succession may, in fact, be executed substantially concurrently, or the blocks may sometimes be executed in the reverse order, depending upon the functionality involved. It will also be noted that each block of FIG. 9A, FIG. 9B, FIG. 10A, FIG. 10B, FIG. 11A, and FIG. 11B and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An authentication method, the method comprising:
 receiving from an initiating user, by a security tool, a request for a transaction, the security tool including a security information store that includes a personal profile information store, an application profile information store and an authentication layer information store,
  wherein the personal profile information store stores for each initiating user a respective initiating user personal ID key, a respective interacting user relationship ID and a respective authentication key,
  wherein the application profile information store stores for each initiating user a respective initiating user personal ID key, a respective application ID key and a respective authentication key,
  wherein the authentication layer information store stores the authentication keys of the personal profile information store and the application profile information store, and for each of the authentication keys stores a respective authentication name, a respective authentication method, a respective authentication type, and a respective application ID key;
 performing, by the security tool, a first authentication of the initiating user for the transaction, the first authentication employing a first authentication level, the security tool employing the authentication key of the initiating user in the personal profile information store to map to and access security attribute information in the authentication layer information store corresponding to the initiating user, thus specifying an authentication method and an authentication type to be used in performing the first authentication;

authorizing the transaction to proceed, by the security tool, in response to the first authentication of the initiating user; and performing, by the security tool, a plurality of subsequent authentications of the initiating user after the first authentication of the initiating user and during the transaction;

wherein at least one of the plurality of subsequent authentications employs a different authentication level than the first authentication level.

2. The authentication method of claim 1, wherein the security tool performs the plurality of subsequent authentications substantially continuously after the first authentication.

3. The authentication method of claim 1, further comprising modifying, by the security tool, the authentication level of at least one of the subsequent authentications as a function of a relationship between the initiating user and an interacting user.

4. The authentication method of claim 1, further comprising modifying, by the security tool, the authentication level of at least one of the subsequent authentications as a function lack of confidence in the authenticity of the user.

5. The authentication method of claim 1, wherein the different authentication levels include at least one of a password test, a challenge question test, a fingerprint test, a mouse click behavior test, a keystroke behavior test and a retinal scan test.

6. The authentication method of claim 2, wherein the security tool determines and stores a learned user attribute history from the plurality of subsequent authentications, the security tool accessing the learned user attribute history to ascertain the correctness of at least one of the plurality of subsequent authentications.

7. The authentication method of claim 1, further comprising accessing, by the security tool, at least one of the personal profile information store, the application profile information store, the authentication layer information store, a verification layer information store and an analysis layer information store to perform the first authentication and subsequent authentications.

8. The authentication method of claim 1, further comprising switching, by the security tool, from a passive authentication mode to an active authentication mode in response to an authentication failure in at least one of the plurality of subsequent authentications.

9. An information handling system (IHS), comprising:
a processor;
a memory, coupled to the processor, the memory being configured with a security tool that includes a security information store, the security information store including a personal profile information store, an application profile information store and an authentication layer information store,
wherein the personal profile information store stores for each initiating user a respective initiating user personal ID key, a respective interacting user relationship ID and a respective authentication key,
wherein the application profile information store stores for each initiating user a respective initiating user personal ID key, a respective application ID key and a respective authentication key,
wherein the authentication layer information store stores the authentication keys of the personal profile information store and the application profile information store, and for each of the authentication keys stores a respective authentication name, a respective authentication method, a
wherein the security tool:
receives from an initiating user a request for a transaction;
performs a first authentication of the initiating user for the transaction, the first authentication employing a first authentication level, the security tool employing the authentication key of the initiating user in the personal profile information store to map to and access security attribute information in the authentication layer information store corresponding to the initiating user, thus specifying an authentication method and an authentication type to be used in performing the first authentication;
authorizes the transaction to commence in response to the first authentication of the initiating user; and
performs a plurality of subsequent authentications of the initiating user after the first authentication of the initiating user and during the transaction,
wherein at least one of the plurality of subsequent authentications employs a different authentication level than the first authentication level.

10. The IHS of claim 9, wherein the security tool performs the plurality of subsequent authentications substantially continuously after the first authentication.

11. The IHS of claim 9, wherein the security tool modifies the authentication level of at least one of the subsequent authentications as a function of a relationship between the initiating user and an interacting user.

12. The IHS of claim 11, wherein the security tool modifies the authentication level of at least one of the subsequent authentications as a function lack of confidence in the authenticity of the user.

13. The IHS of claim 9, wherein the different authentication levels include at least one of a password test, a challenge question test, a fingerprint test, a mouse click behavior test, a keystroke behavior test and a retinal scan test.

14. The IHS of claim 10, wherein the security tool determines and stores a learned user attribute history from the plurality of subsequent authentications, the security tool accessing the learned user attribute history to ascertain the correctness of at least one of the plurality of subsequent authentications.

15. The IHS of claim 9, wherein the security tool accesses at least one of the personal profile information store, the application profile information store, the authentication layer information store, a verification layer information store and an analysis layer information store to perform the first authentication and subsequent authentications.

16. The IHS of claim 9, wherein the security tool switches from a passive authentication mode to an active authentication mode in response to an authentication failure in at least one of the plurality of subsequent authentications.

17. A security tool computer program product, comprising:
a non-transitory computer readable storage medium;
first instructions that receive a request for a transaction from an initiating user, the first instructions accessing a security information store that include a personal profile information store, an application profile information store and an authentication layer information store,
wherein the personal profile information store stores for each initiating user a respective initiating user personal ID key, a respective interacting user relationship ID and a respective authentication key, wherein the application profile information store stores for each initiating user a respective initiating user personal ID key, a respective application ID key and a respective authentication key, wherein the authentication layer information store stores the authentication keys of the personal profile information store and the application profile information store, and for each of the authentication keys stores a respective authentication name, a respective authentication method, a respective authentication type, and a respective application ID key;

second instructions that perform a first authentication of the initiating user for the transaction, the first authentication employing a first authentication level of the initiating user, the second instructions employing the authentication key of the initiating user in the personal profile information store to map to and access security attribute information in the authentication layer information store corresponding to the initiating user, thus specifying an authentication method and an authentication type to be used in performing the first authentication;

third instructions that authorize the transaction to proceed in response to the first authentication of the initiating user;

fourth instructions that perform a plurality of subsequent authentications of the initiating user after the first authentication of the initiating user and during the transaction, wherein at least one of the plurality of subsequent authentications employs a different authentication level than the first authentication;

wherein the first, second, third and fourth instructions are stored on the computer readable storage medium.

18. The security tool computer program product of claim 17, further comprising:

fifth instructions that modify the authentication level of at least one of the subsequent authentications as a function of a relationship between the initiating user and an interacting user.

19. The security tool computer program product of claim 17, further comprising:

sixth instructions that determine and store a learned user attribute history from the plurality of subsequent authentications, the sixth instructions accessing the learned user attribute history to ascertain the correctness of at least one of the plurality of subsequent authentications.

20. The security tool computer program product of claim 17, further comprising: seventh instructions that switch from a passive authentication mode to an active authentication mode in response to an authentication failure in at least one of the plurality of subsequent authentications.

* * * * *